United States Patent
Ryu et al.

(10) Patent No.: US 10,742,792 B2
(45) Date of Patent: Aug. 11, 2020

(54) MOBILE TERMINAL

(71) Applicant: LG ELECTRONICS INC., Seoul (KR)

(72) Inventors: Grami Ryu, Seoul (KR); Soyeon Yim, Seoul (KR); Taeryung Rhee, Seoul (KR); Mijun Yoo, Seoul (KR); Yongdeok Lee, Seoul (KR); Yoojin Kang, Seoul (KR); Junghoon Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/753,913

(22) PCT Filed: May 25, 2016

(86) PCT No.: PCT/KR2016/005518
§ 371 (c)(1),
(2) Date: Feb. 20, 2018

(87) PCT Pub. No.: WO2017/034126
PCT Pub. Date: Mar. 2, 2017

(65) Prior Publication Data
US 2018/0248991 A1 Aug. 30, 2018

(30) Foreign Application Priority Data

Aug. 25, 2015 (KR) .................. 10-2015-0119403
Sep. 9, 2015 (KR) .................. 10-2015-0127539

(51) Int. Cl.
*H04M 1/725* (2006.01)
*H04B 1/3827* (2015.01)
(Continued)

(52) U.S. Cl.
CPC .......... *H04M 1/7253* (2013.01); *G06F 1/163* (2013.01); *G06F 1/1694* (2013.01); *G06F 3/017* (2013.01);
(Continued)

(58) Field of Classification Search
CPC ........... H04M 1/7258; H04M 1/72583; H04M 2250/60; H04M 1/72569; H04M 1/74;
(Continued)

(56) References Cited

U.S. PATENT DOCUMENTS

2014/0210703 A1 7/2014 Narasimhan et al.
2015/0223355 A1* 8/2015 Fleck ..................... G06F 1/163
361/679.03

(Continued)

FOREIGN PATENT DOCUMENTS

KR 10-2014-0074824 6/2014
KR 10-2014-0132232 11/2014
(Continued)

OTHER PUBLICATIONS

PCT International Application No. PCT/KR2016/005518, International Search Report dated Aug. 24, 2016, 3 pages.

*Primary Examiner* — Ankur Jain
(74) *Attorney, Agent, or Firm* — Lee Hong Degerman Kang & Waimey

(57) ABSTRACT

The present invention provides a mobile terminal and a method for controlling the mobile terminal. According to the present invention, when a change in the posture of a mobile terminal is detected while an external device paired with the mobile terminal is responding to a received call, different information can be displayed according to the change in the posture of the mobile terminal.

9 Claims, 34 Drawing Sheets

(51) Int. Cl.
*G06F 3/01* (2006.01)
*G10L 15/26* (2006.01)
*G06F 3/0346* (2013.01)
*G06F 1/16* (2006.01)
*G06F 3/16* (2006.01)
*G10L 15/22* (2006.01)
*G06F 3/0482* (2013.01)
*G06F 3/0488* (2013.01)

(52) U.S. Cl.
CPC ............ *G06F 3/0346* (2013.01); *G06F 3/167* (2013.01); *G10L 15/265* (2013.01); *H04B 1/385* (2013.01); *H04M 1/72583* (2013.01); *G06F 3/0482* (2013.01); *G06F 3/0488* (2013.01); *G10L 2015/221* (2013.01); *H04M 1/72569* (2013.01); *H04M 2250/60* (2013.01); *H04M 2250/74* (2013.01)

(58) Field of Classification Search
CPC ........ G06F 1/1694; G06F 3/167; G06F 3/017; G06F 3/0346; G06F 3/0482; H06F 1/163; G10L 15/265; G10L 2015/221; H04B 1/385

See application file for complete search history.

(56) References Cited

U.S. PATENT DOCUMENTS

2016/0018872 A1* 1/2016 Tu .................. G06F 1/3234
345/173
2016/0174025 A1* 6/2016 Chaudhri ............... H04B 1/385
455/41.1

FOREIGN PATENT DOCUMENTS

| KR | 10-2014-0147586 | | 12/2014 | |
| KR | 20140147586 | * | 12/2014 | |
| KR | 10-2015-0026651 | | 3/2015 | |
| WO | PCT/US2013032566 | * | 3/2013 | ............. H04W 4/02 |

* cited by examiner

【Figure 1a】
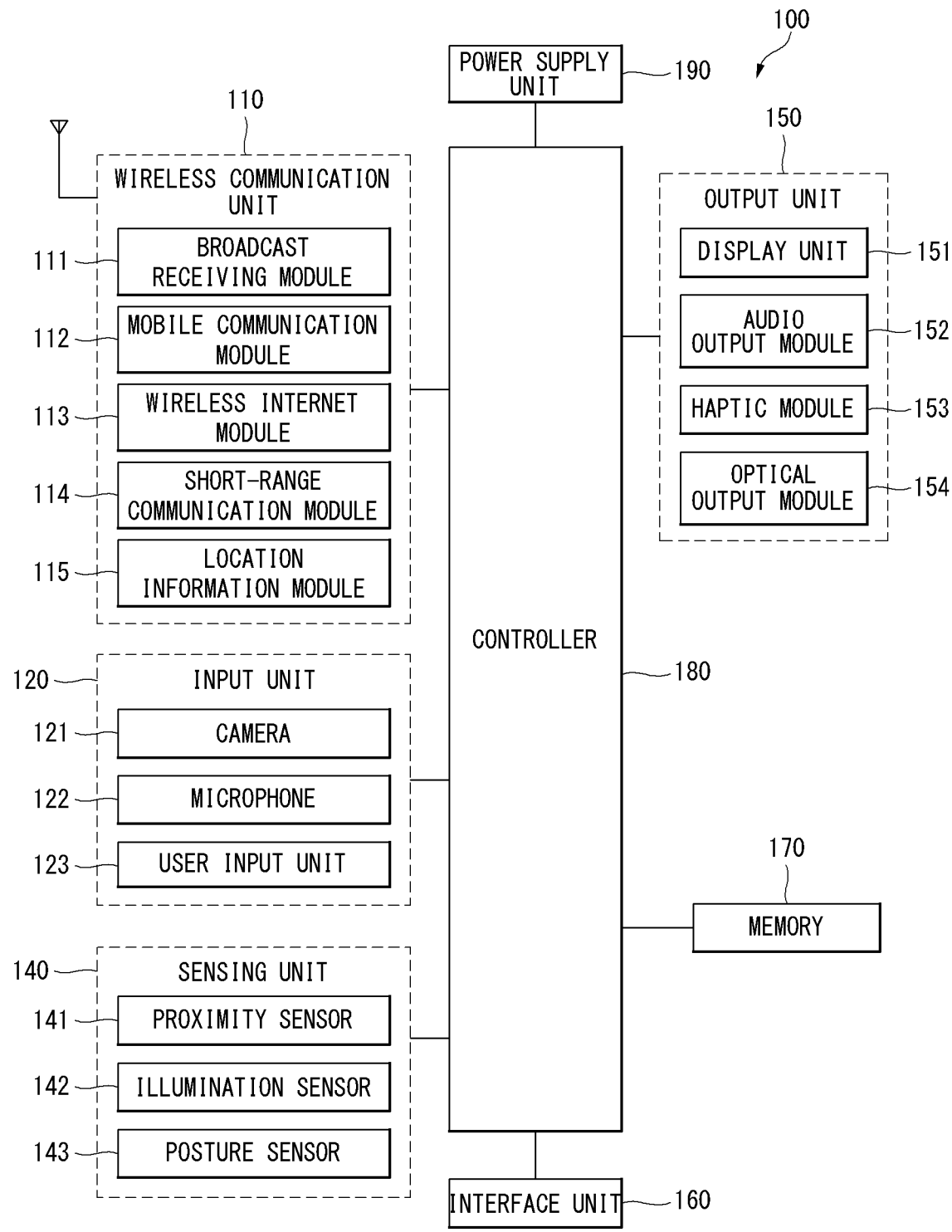

[Figure 1b]
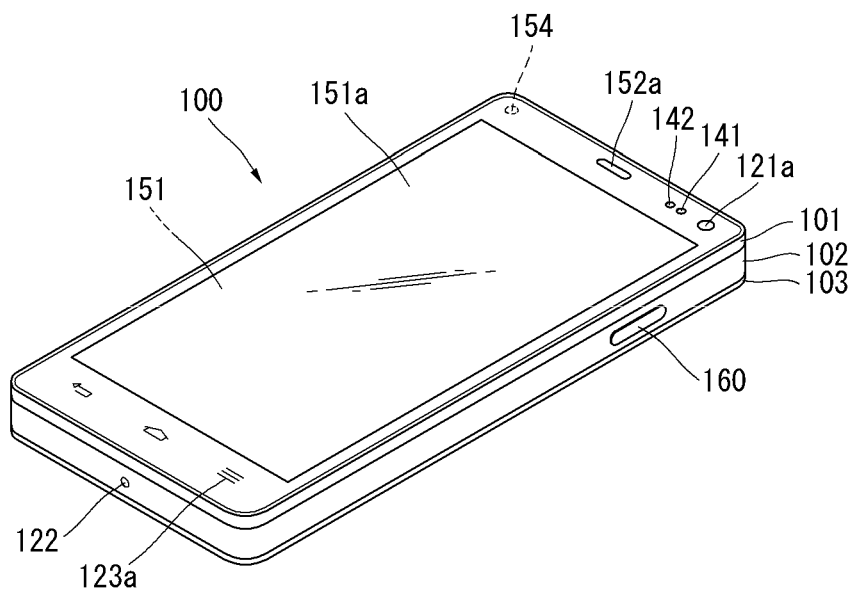
[Figure 1c]
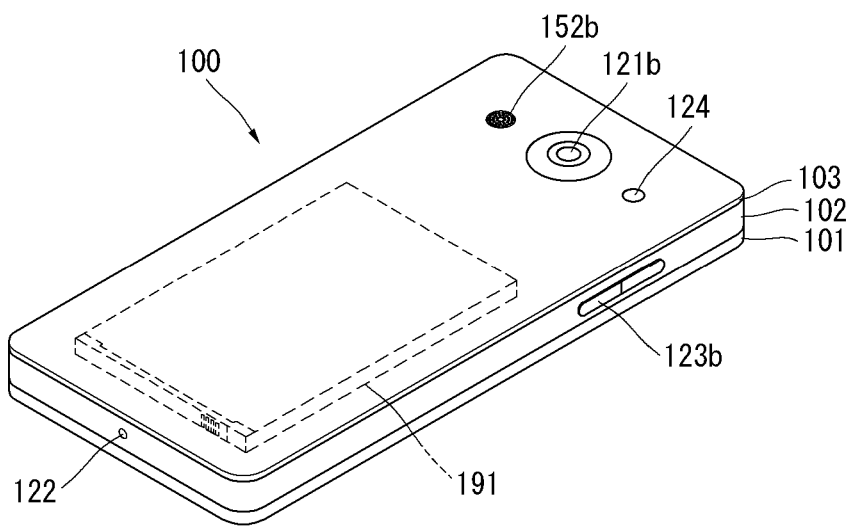

[Figure 2]
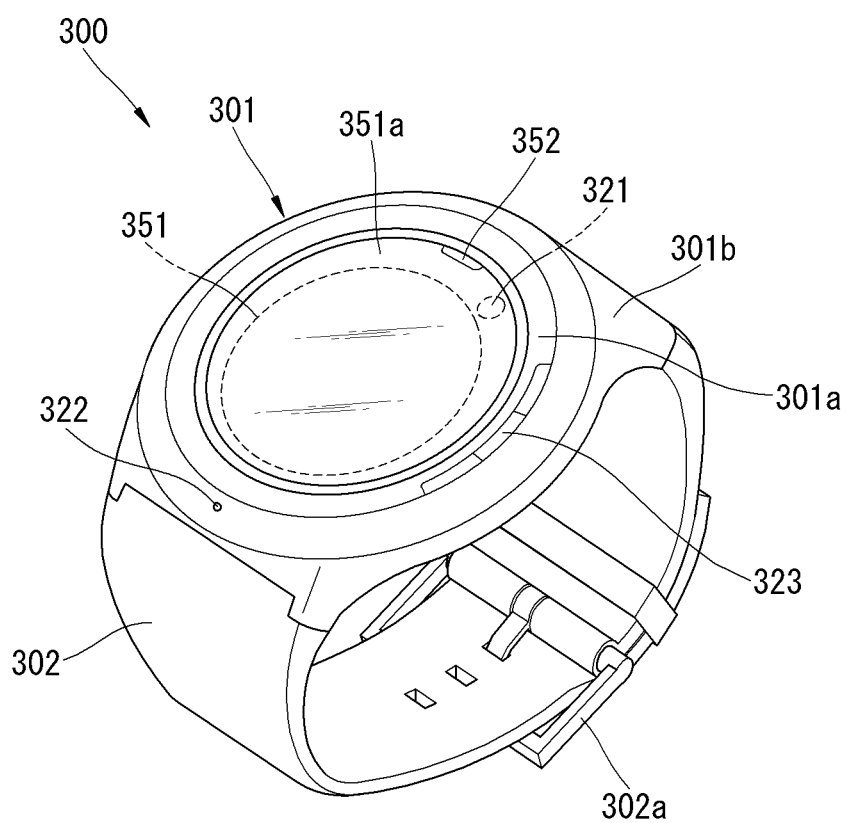

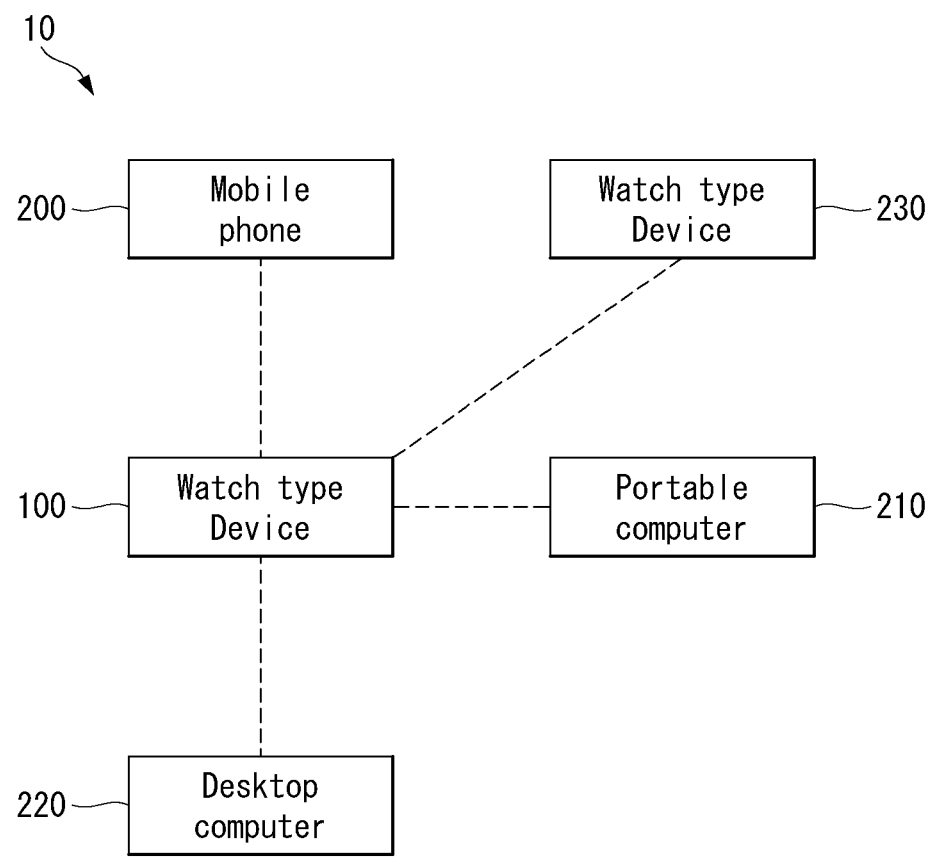
[Figure 3]

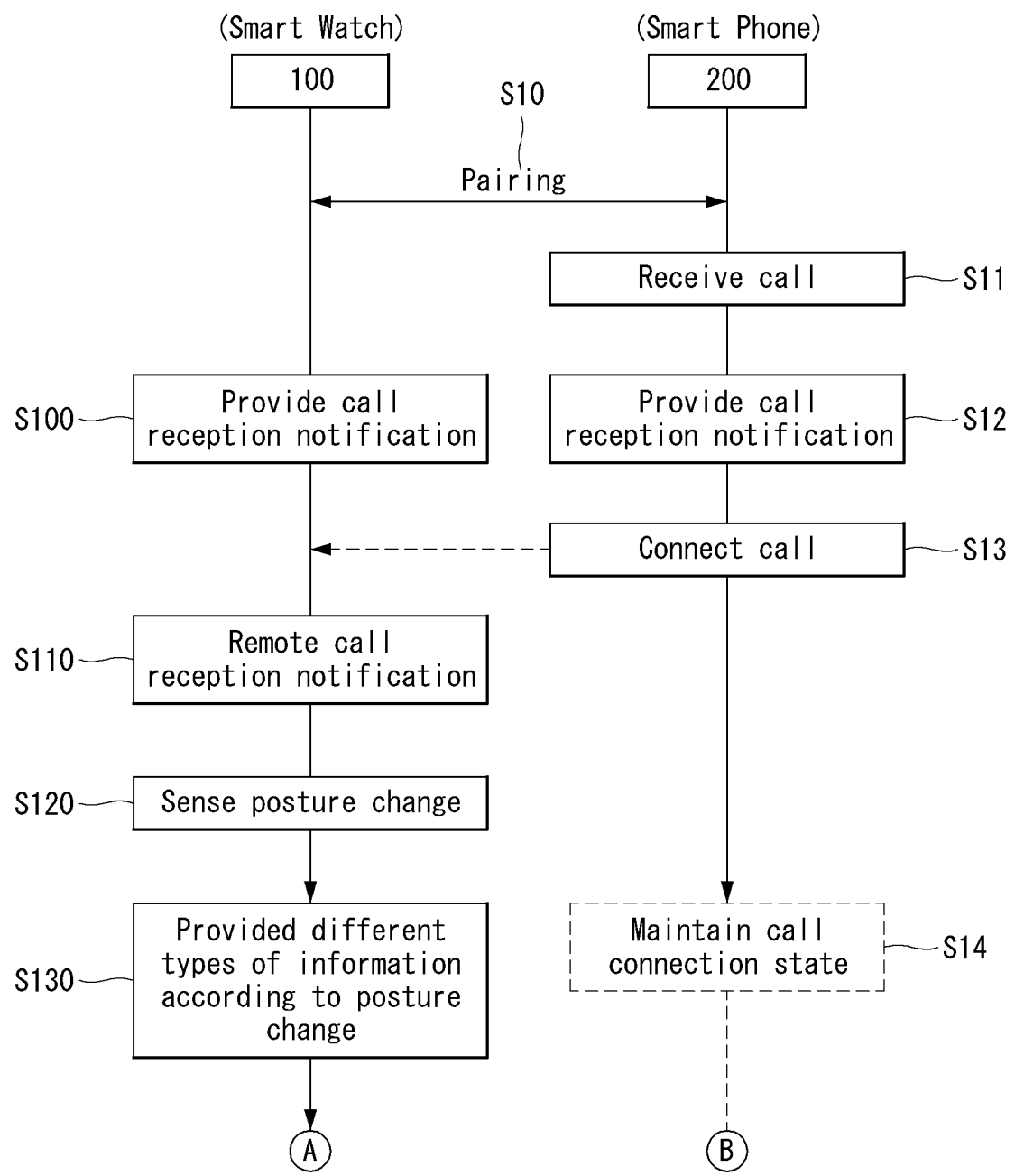
[Figure 4]

【Figure 5a】
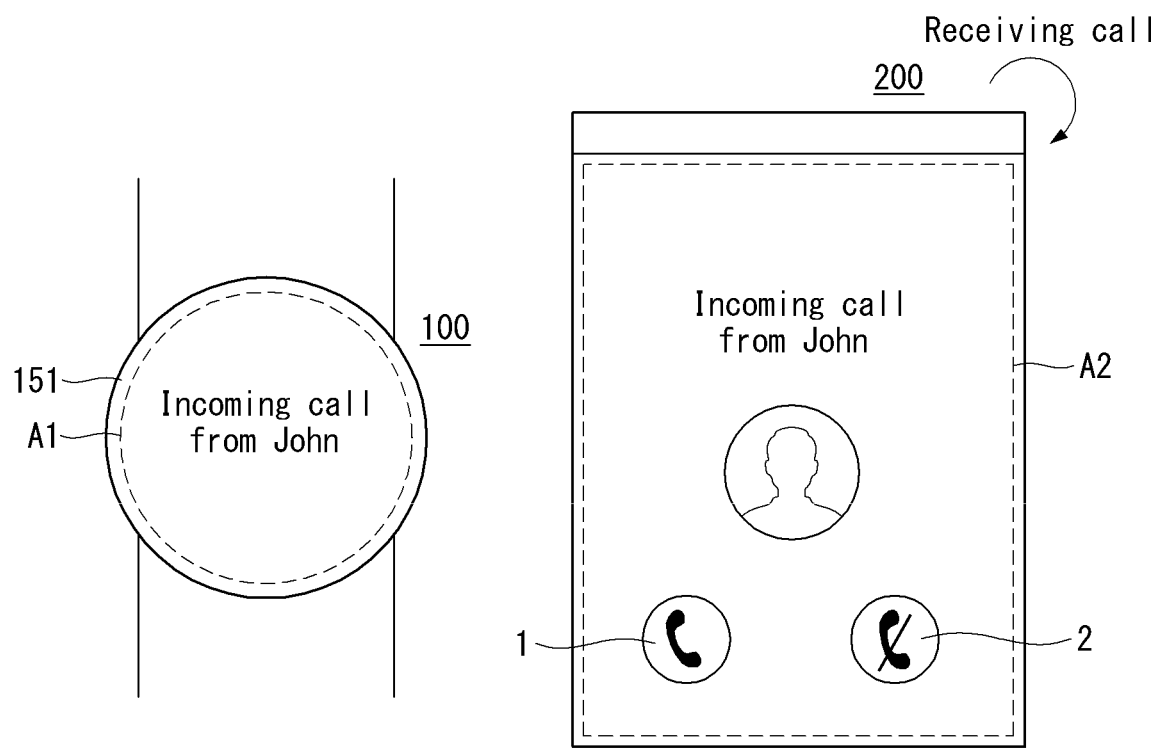

【Figure 5b】
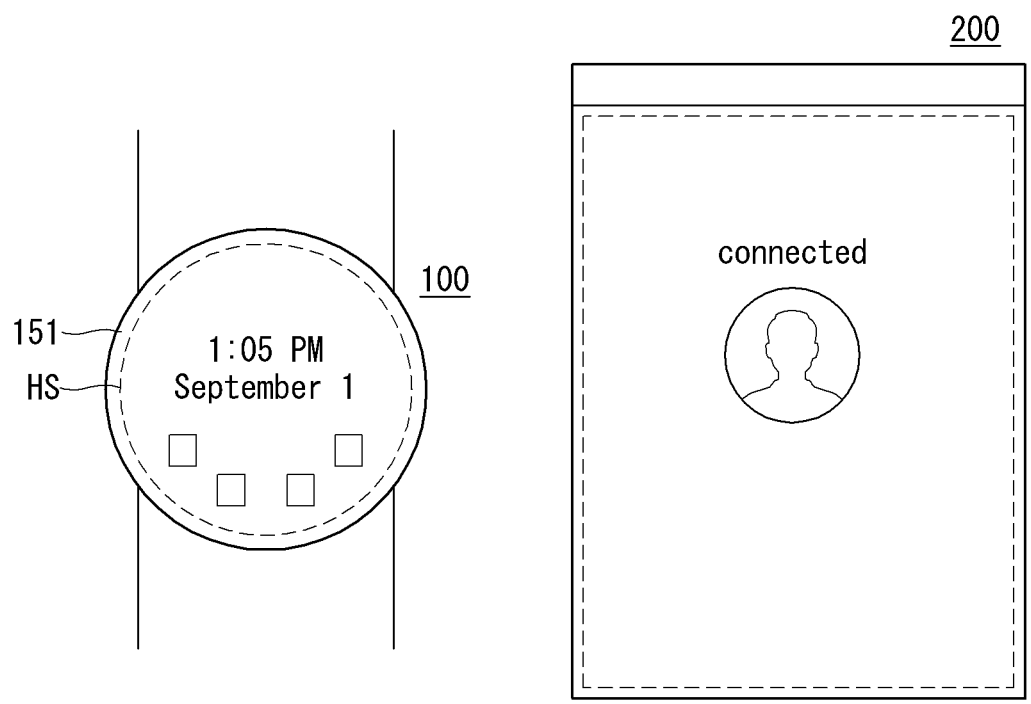
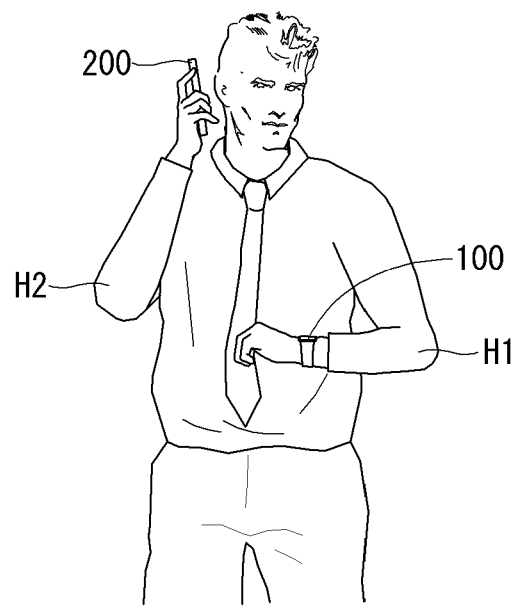

[Figure 6]
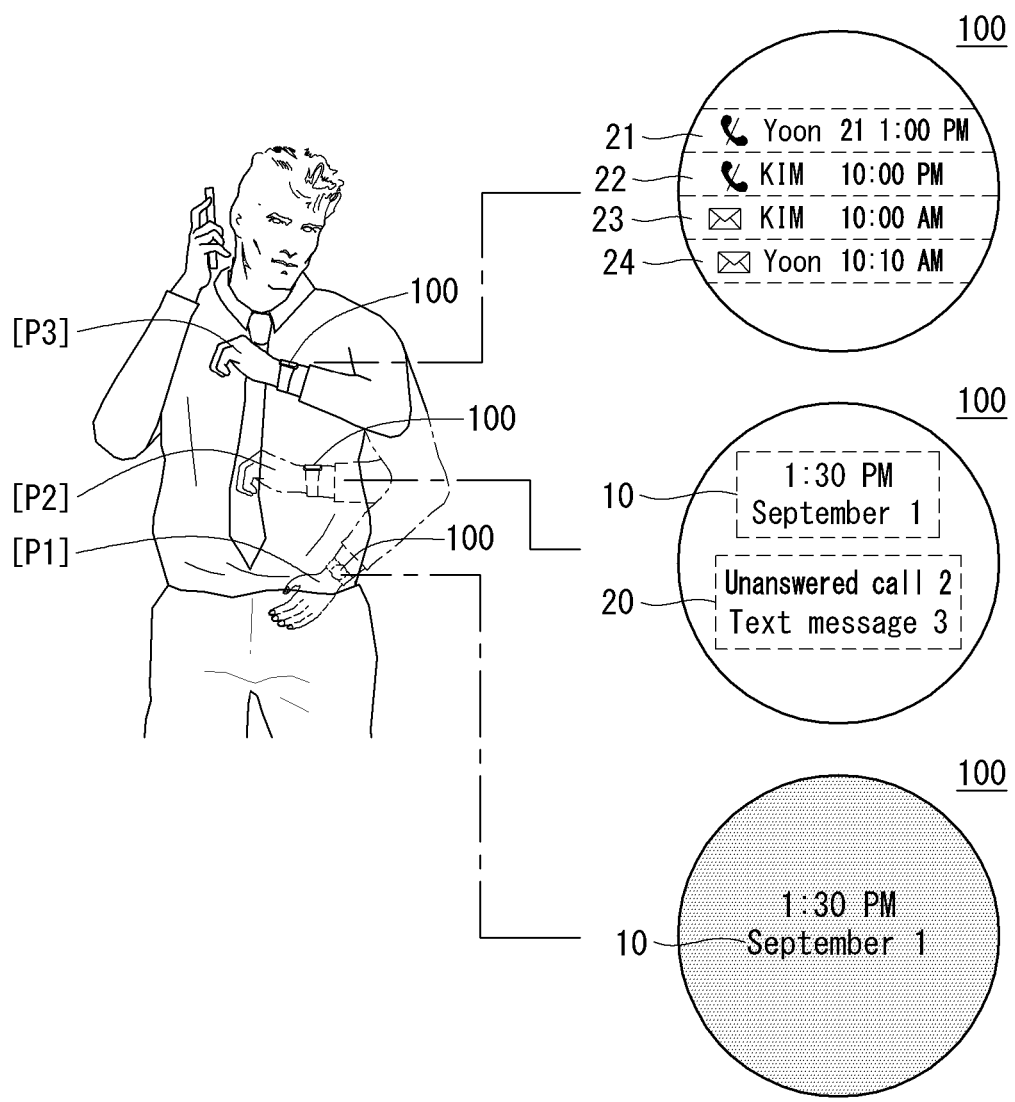

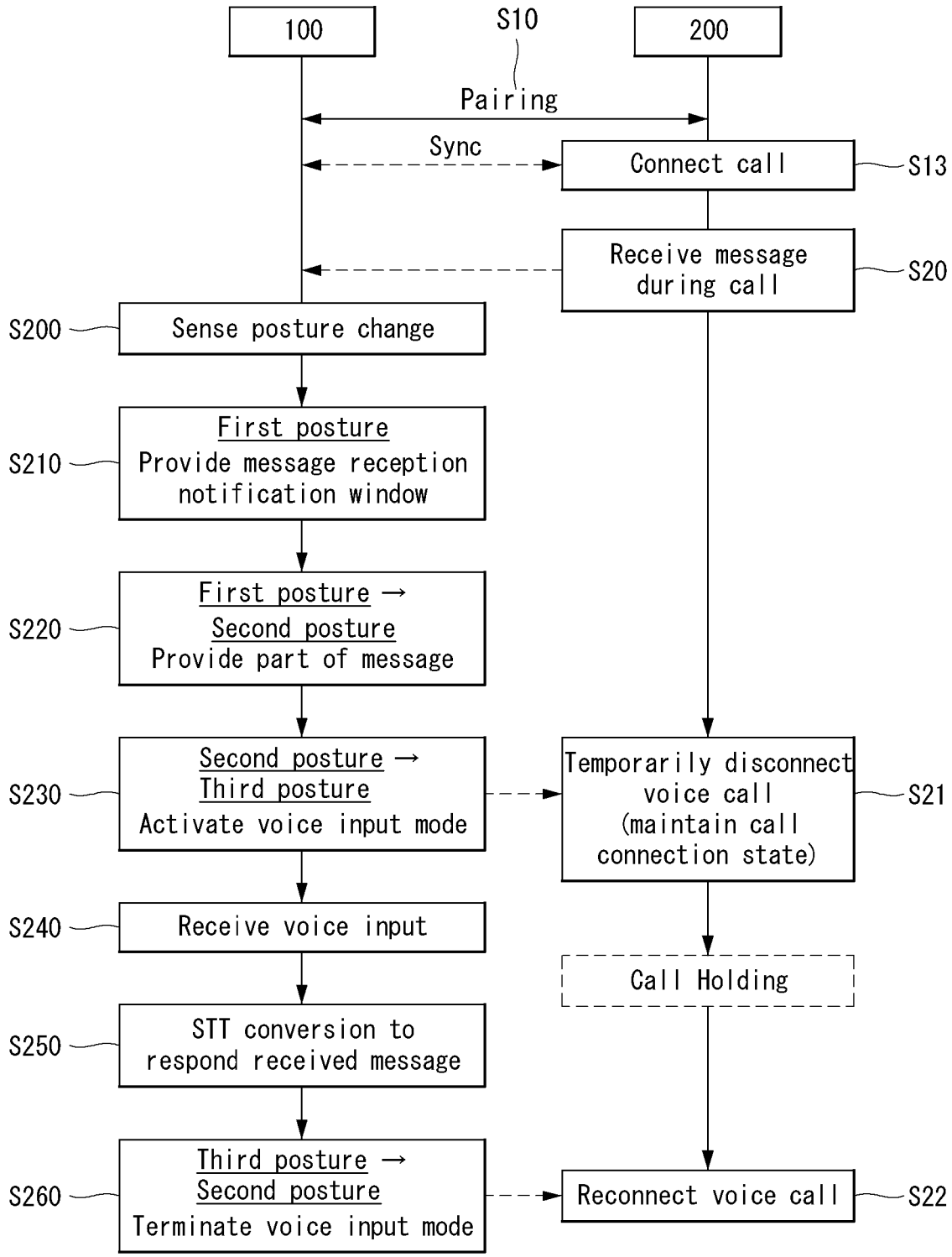
[Figure 7]

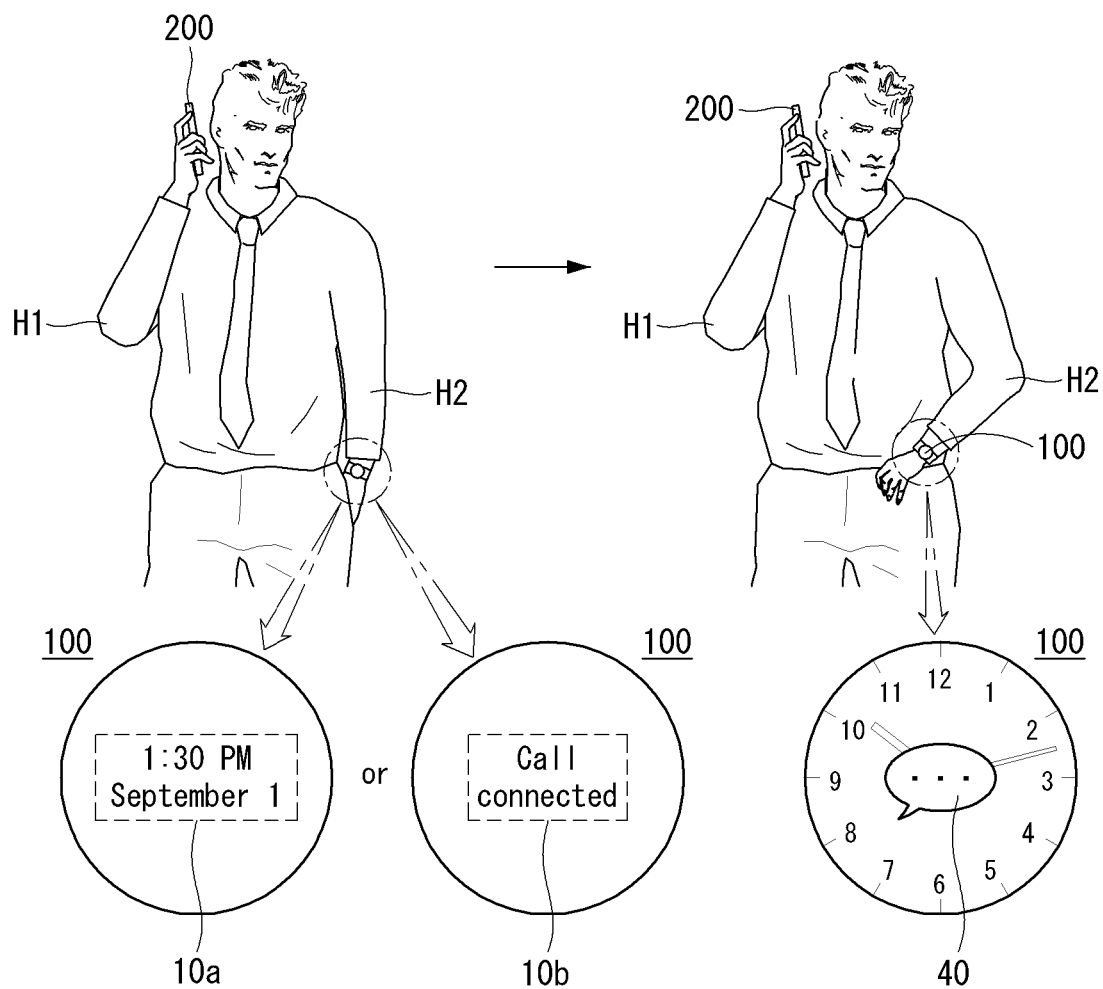
[Figure 8a]

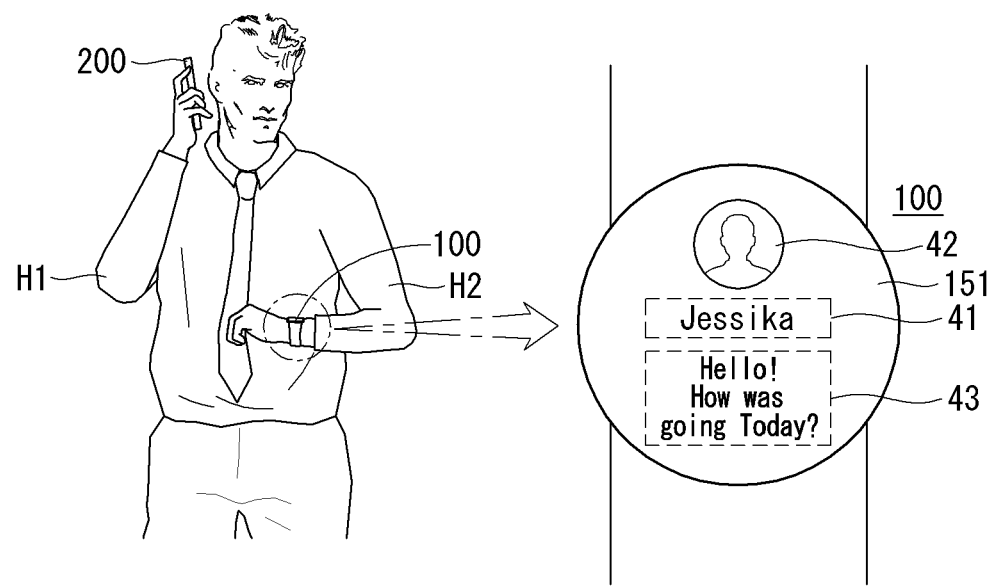
【Figure 8b】

[Figure 8c]
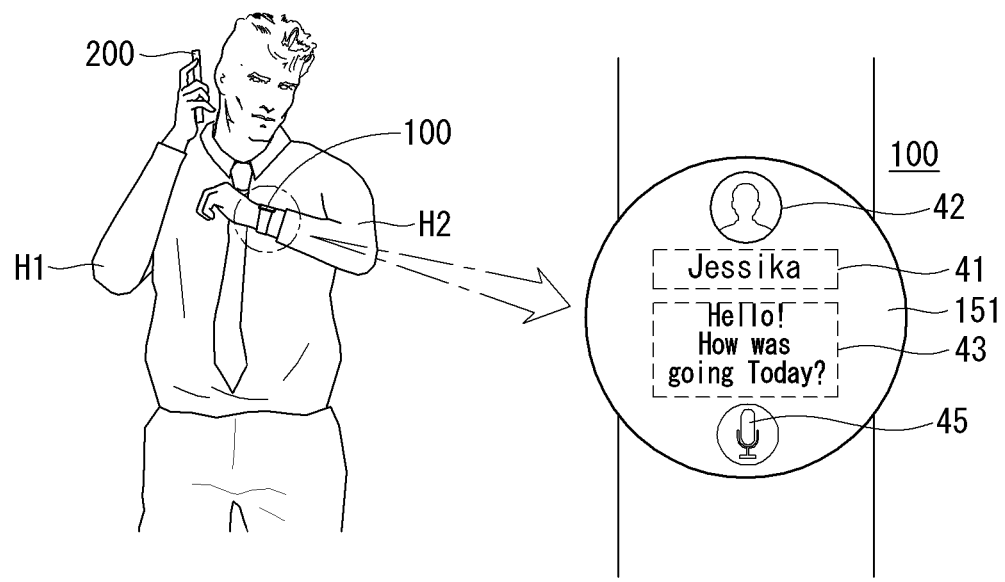
"I,m very busy Today"
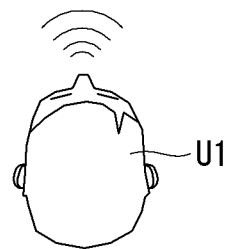

【Figure 8d】
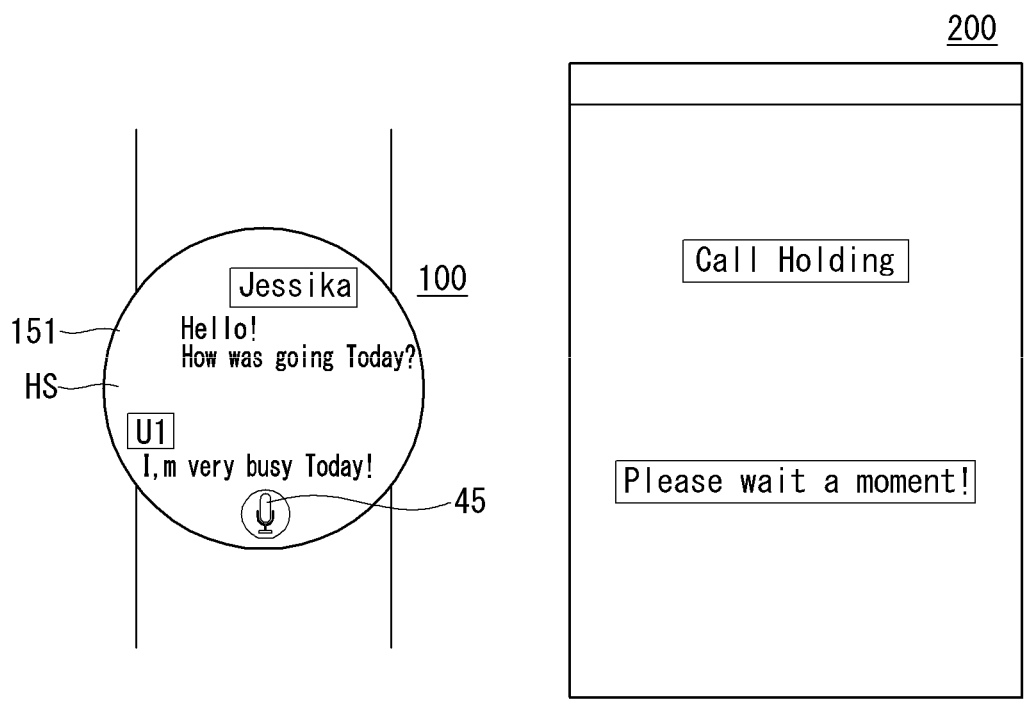

【Figure 8e】
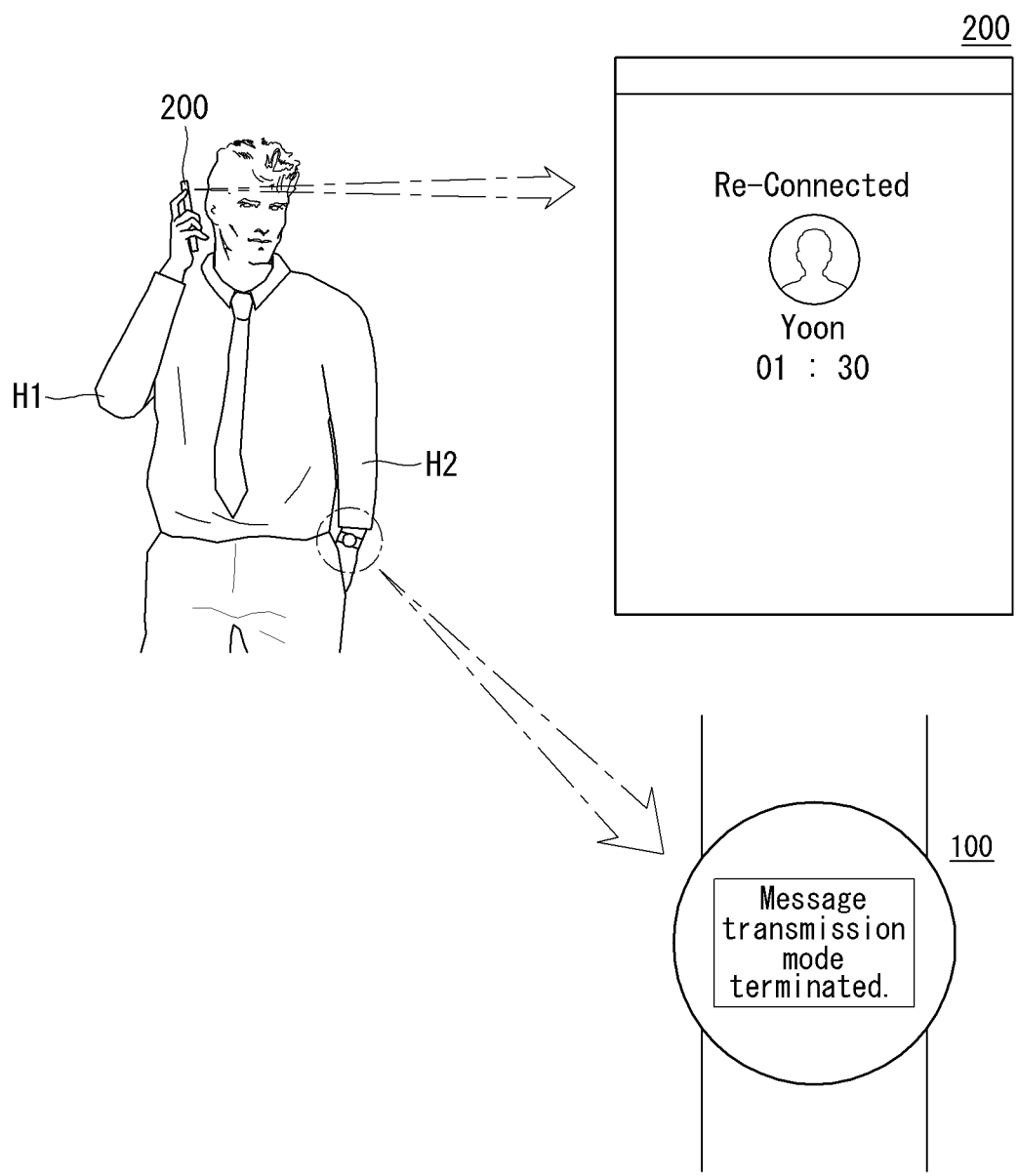

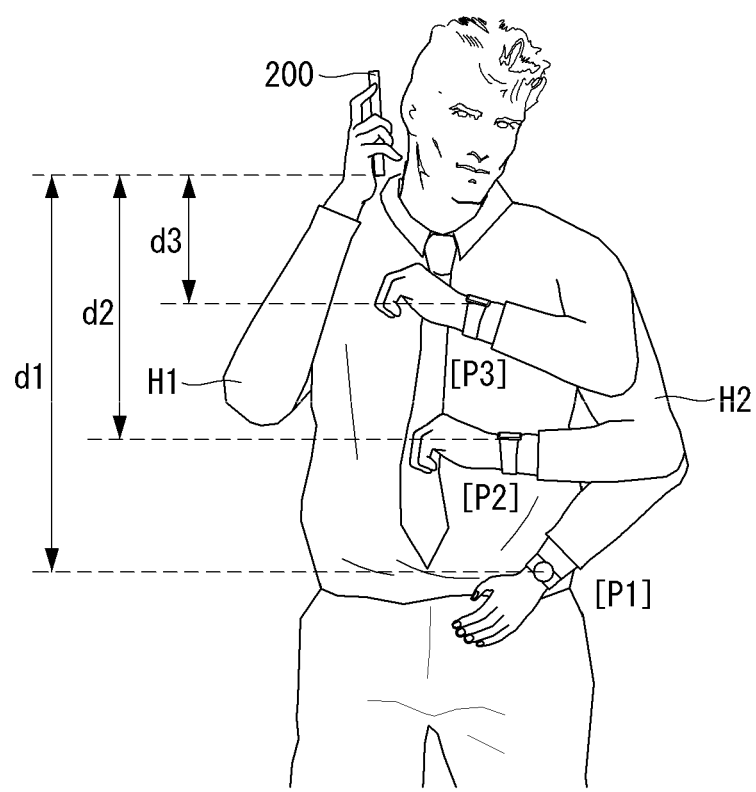
【Figure 9】

[Figure 10]
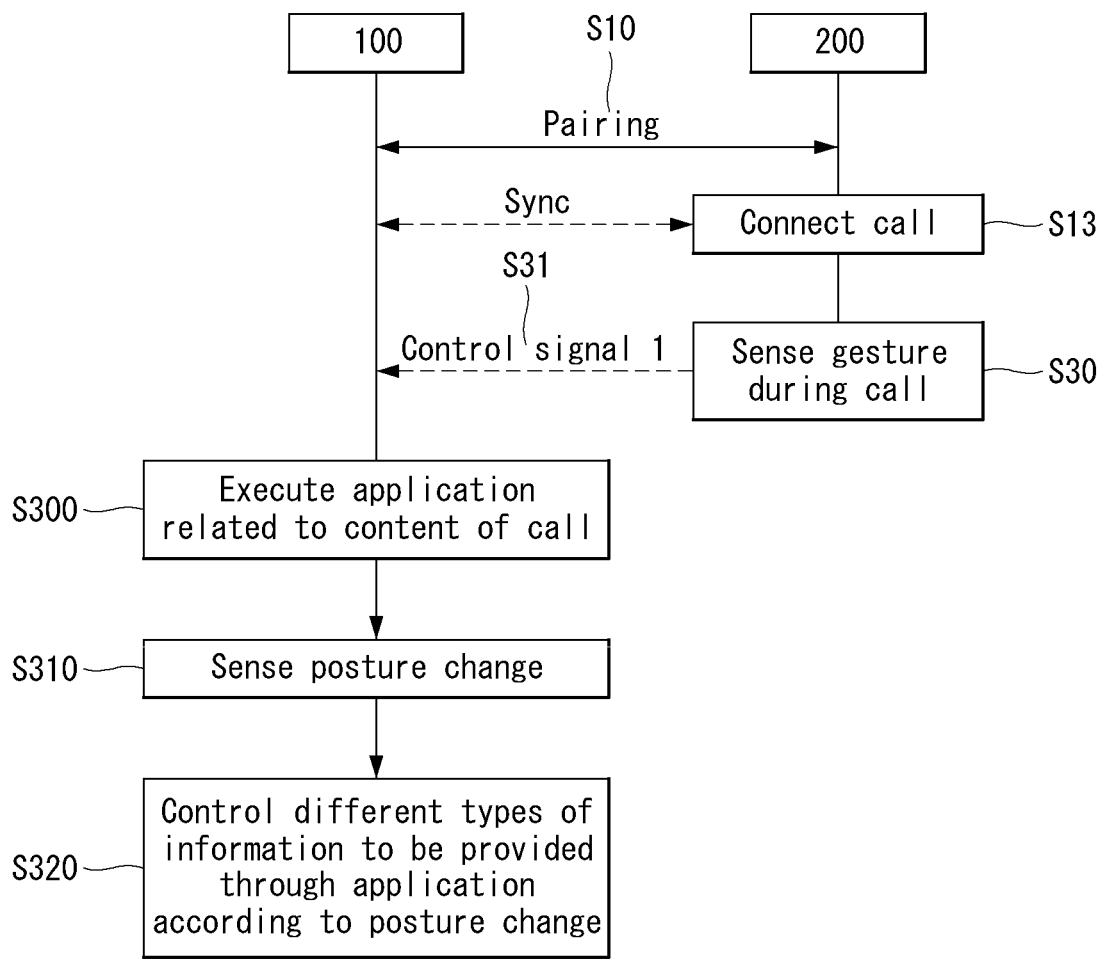

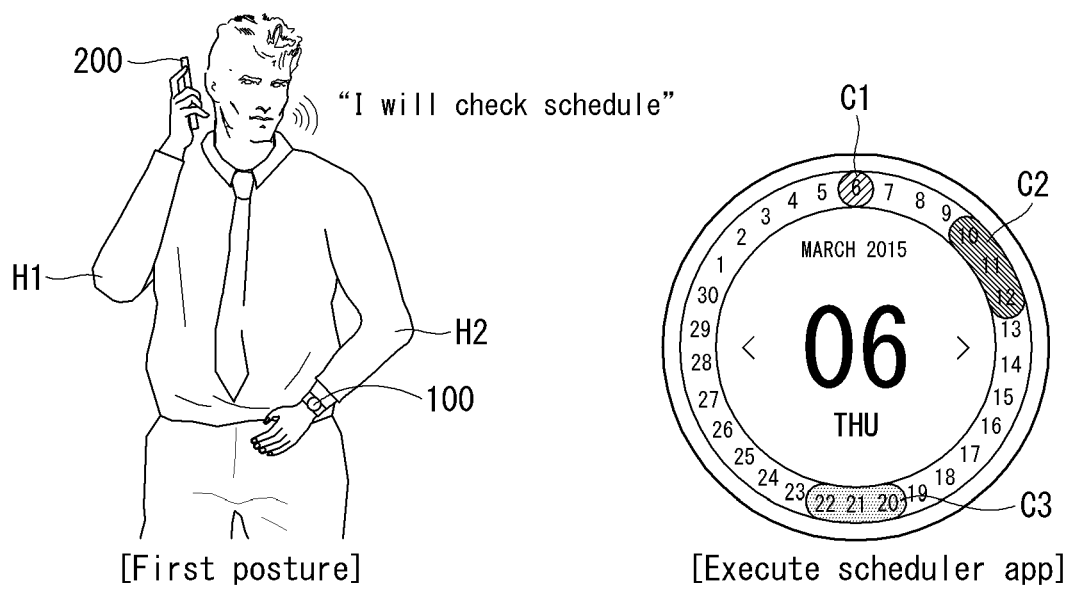

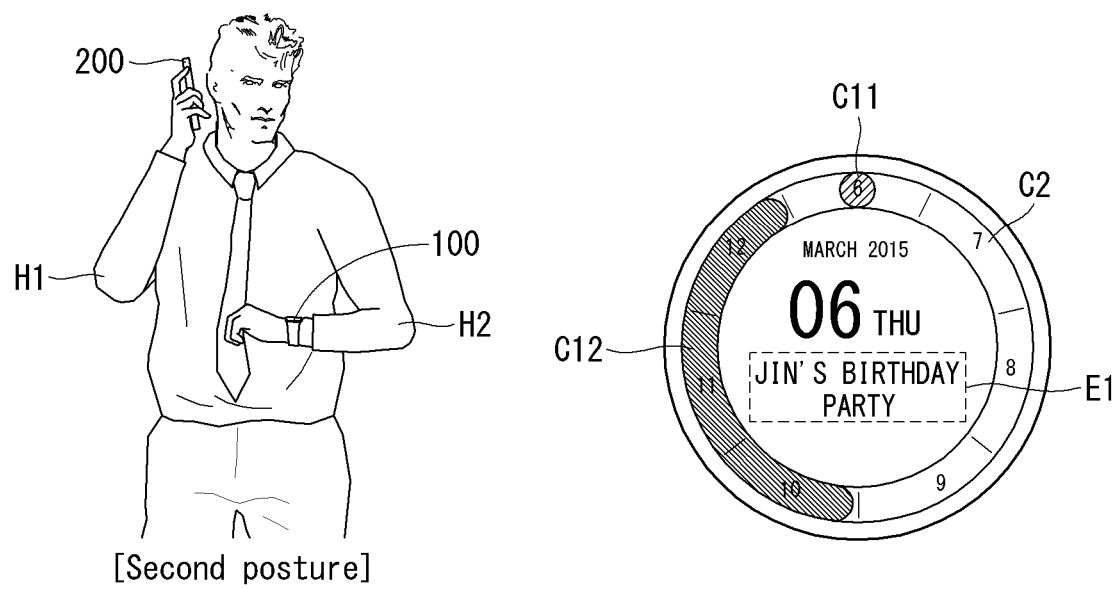
[Figure 11b]
[Second posture]

[Figure 11c]
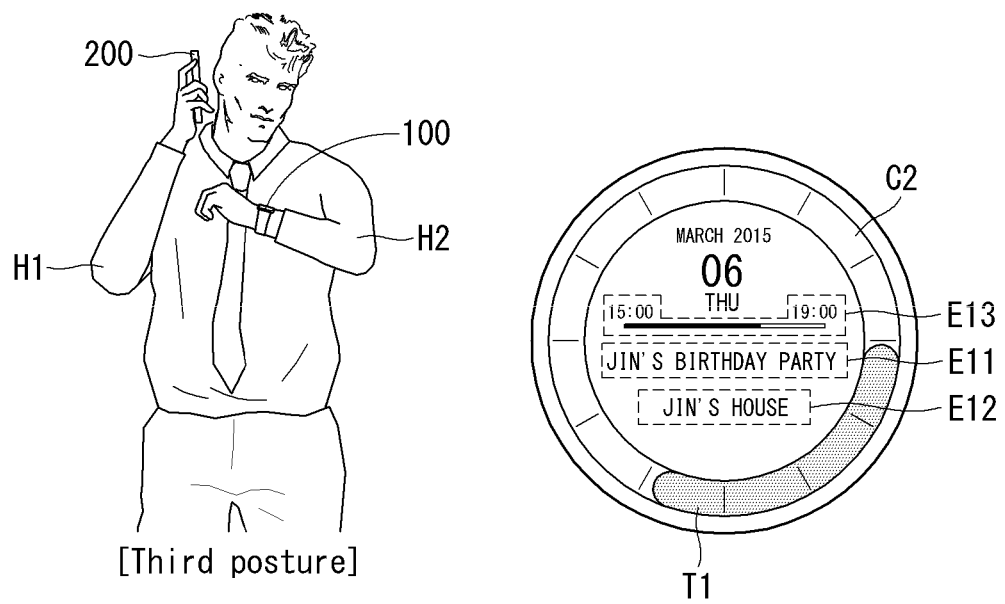

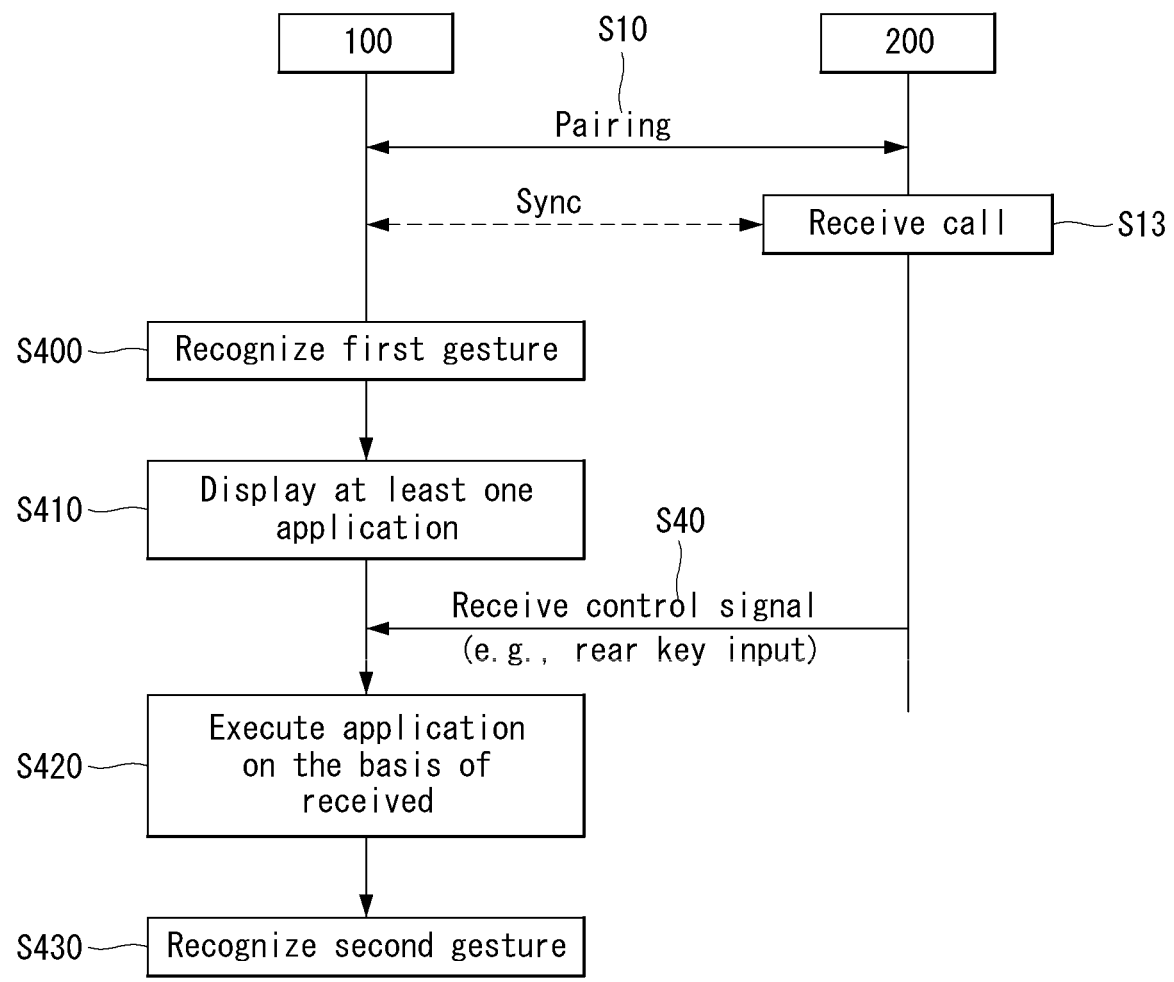
[Figure 12]

【Figure 13a】
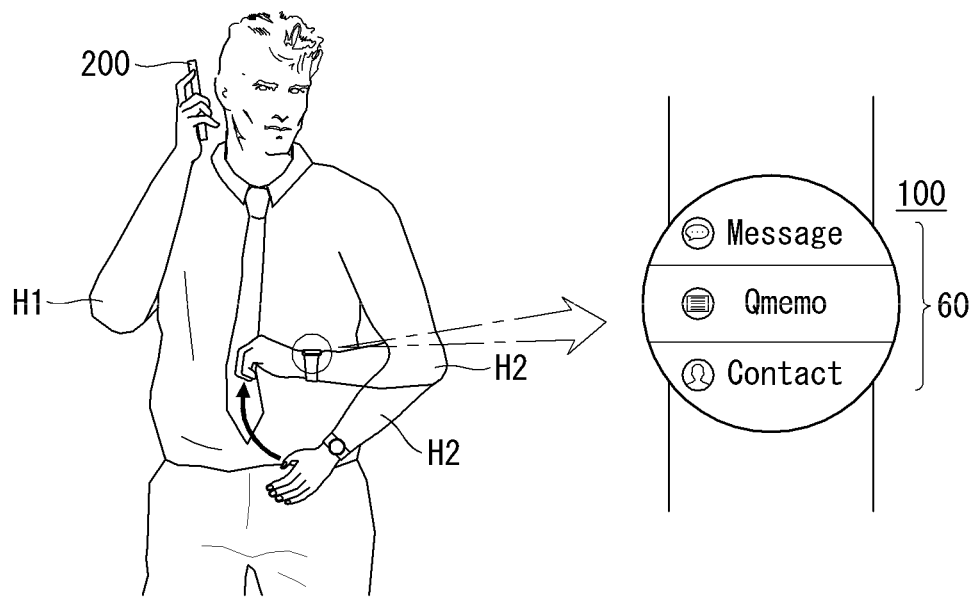

[Figure 13b]
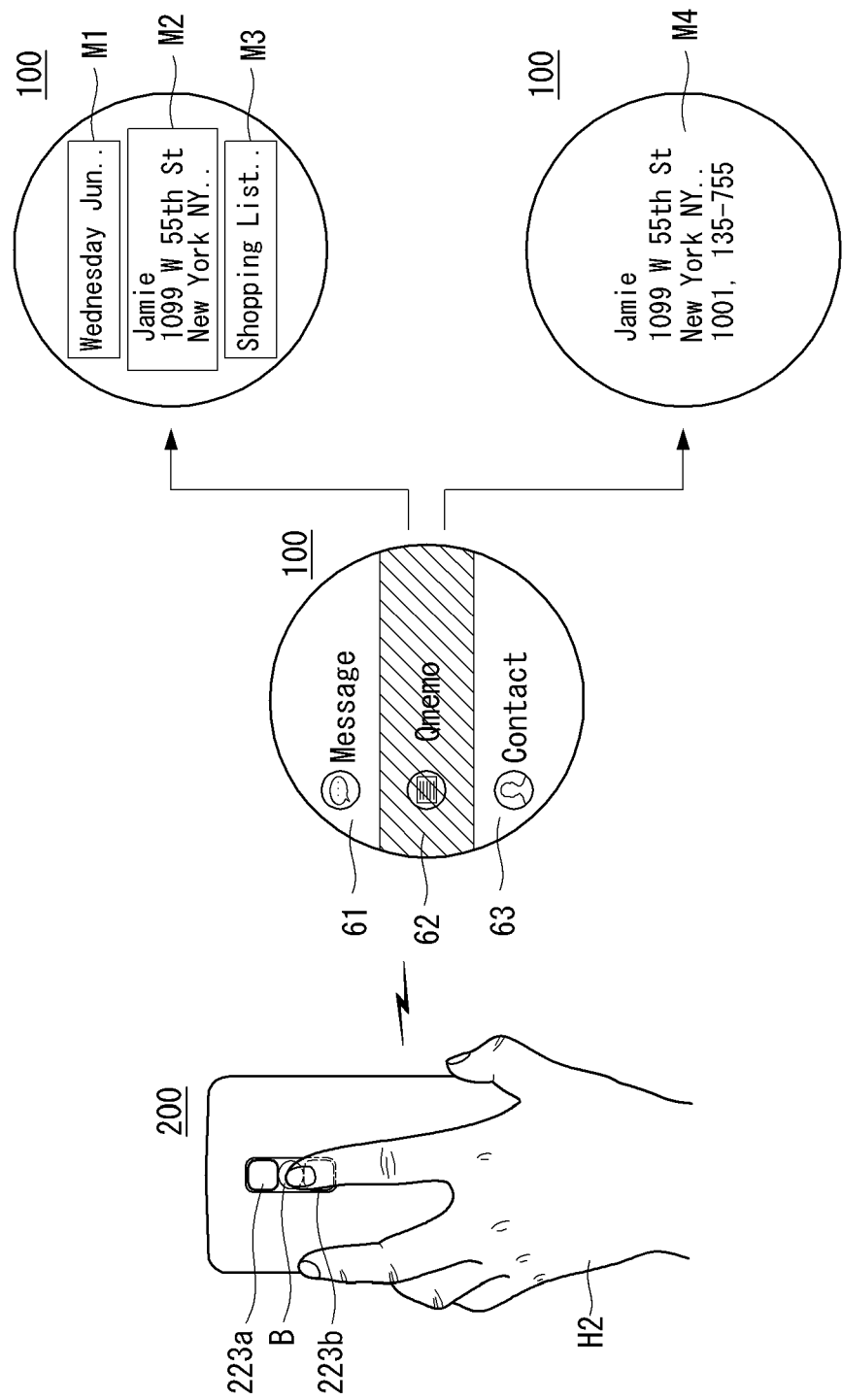

【Figure 14】
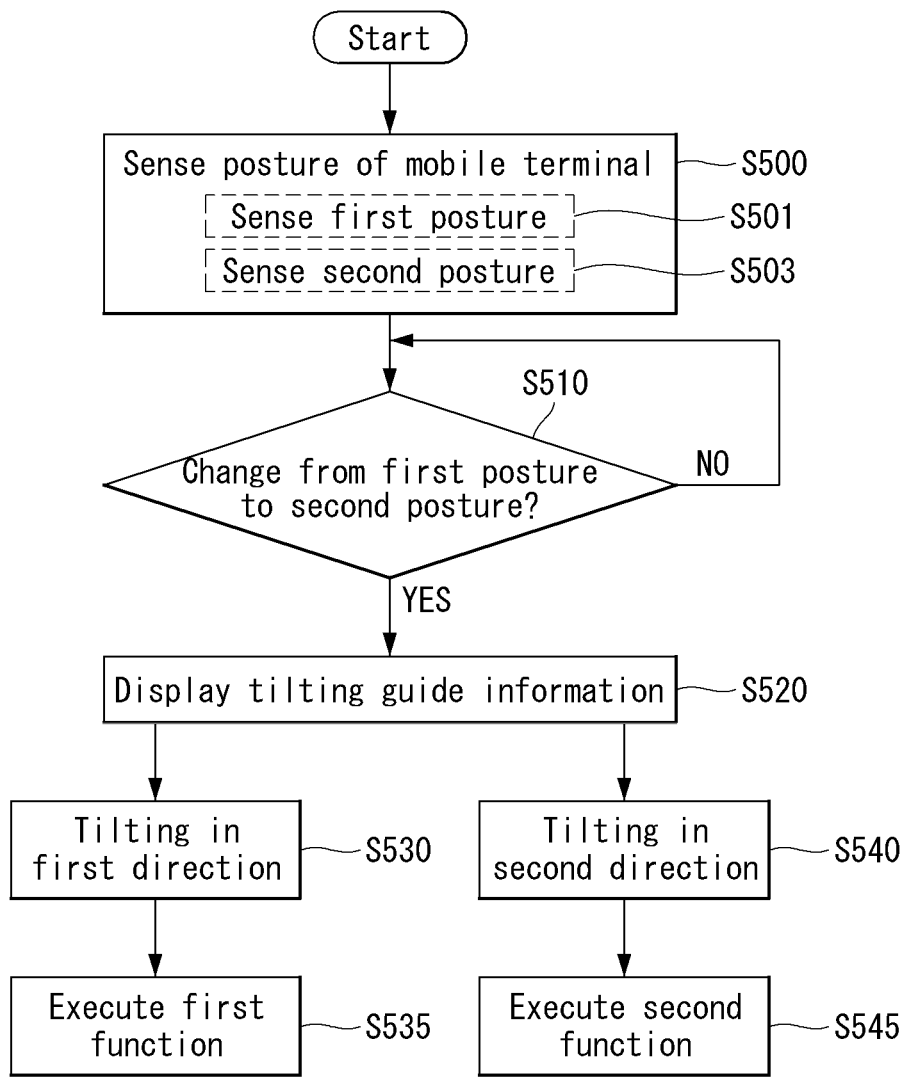

【Figure 15】
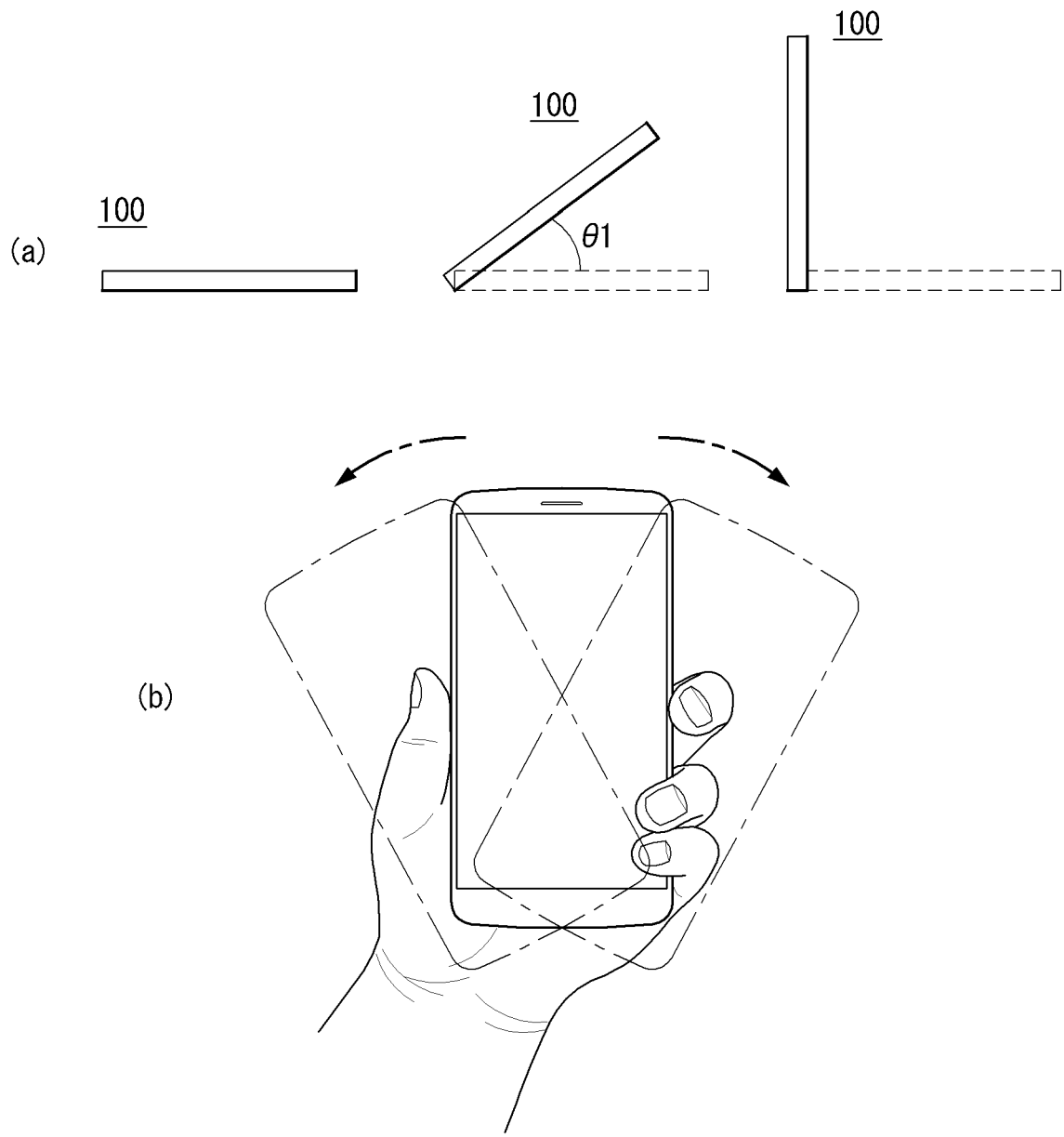

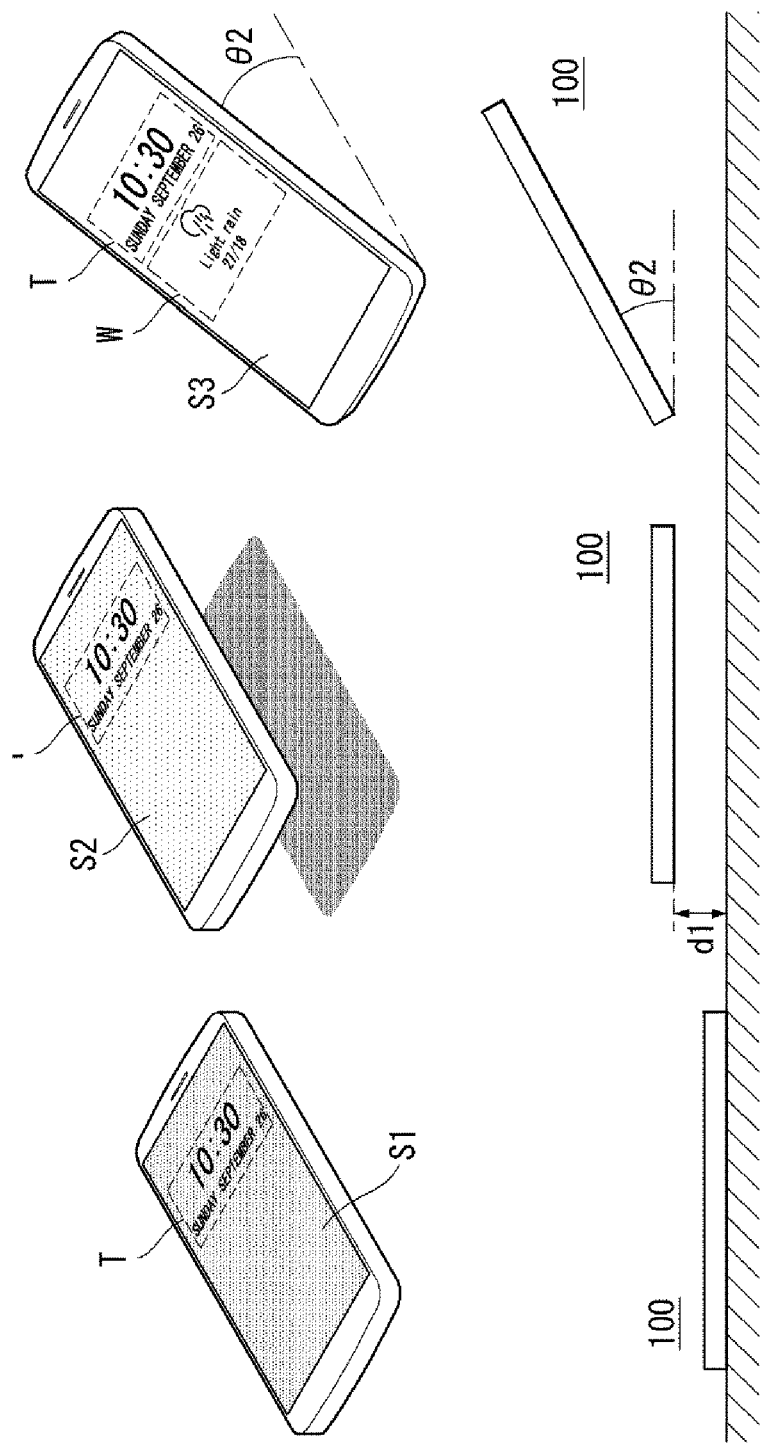
[Figure 16]

【Figure 17】
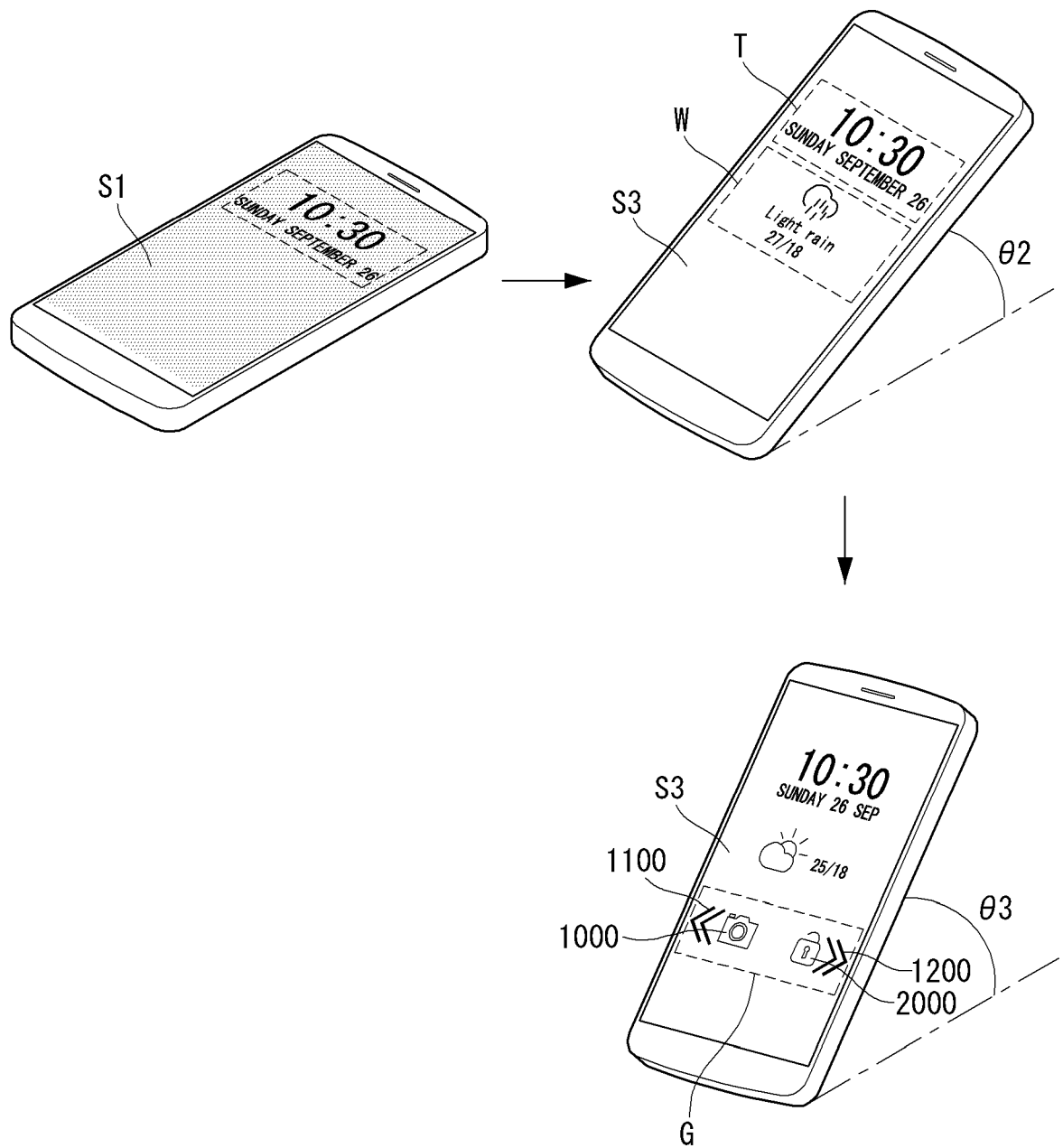

【Figure 18a】
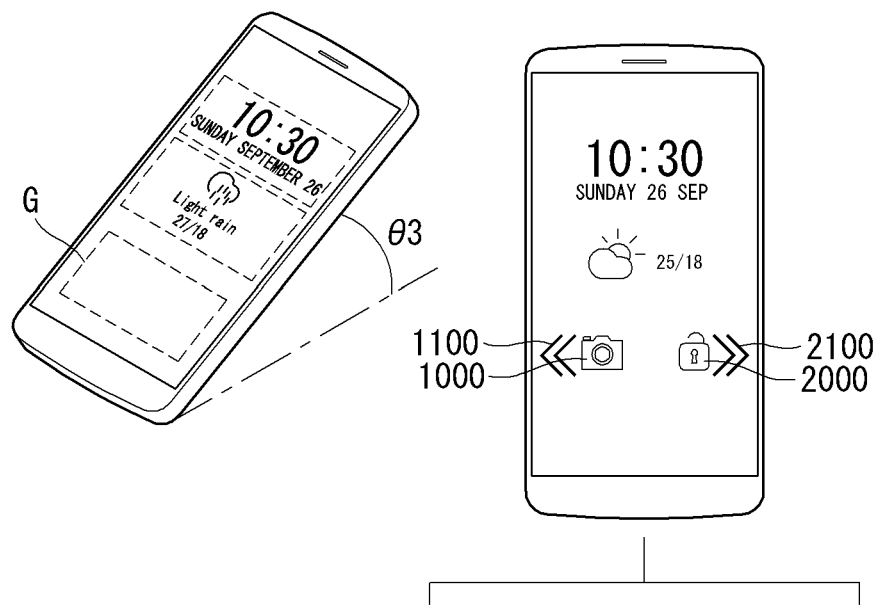
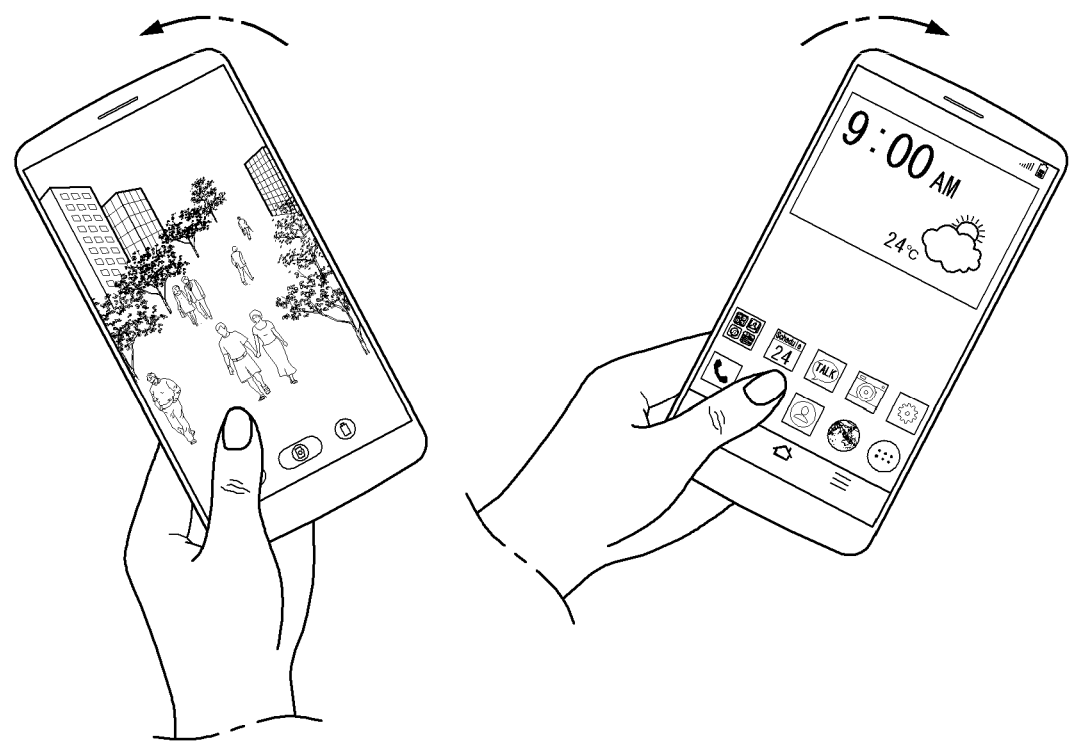

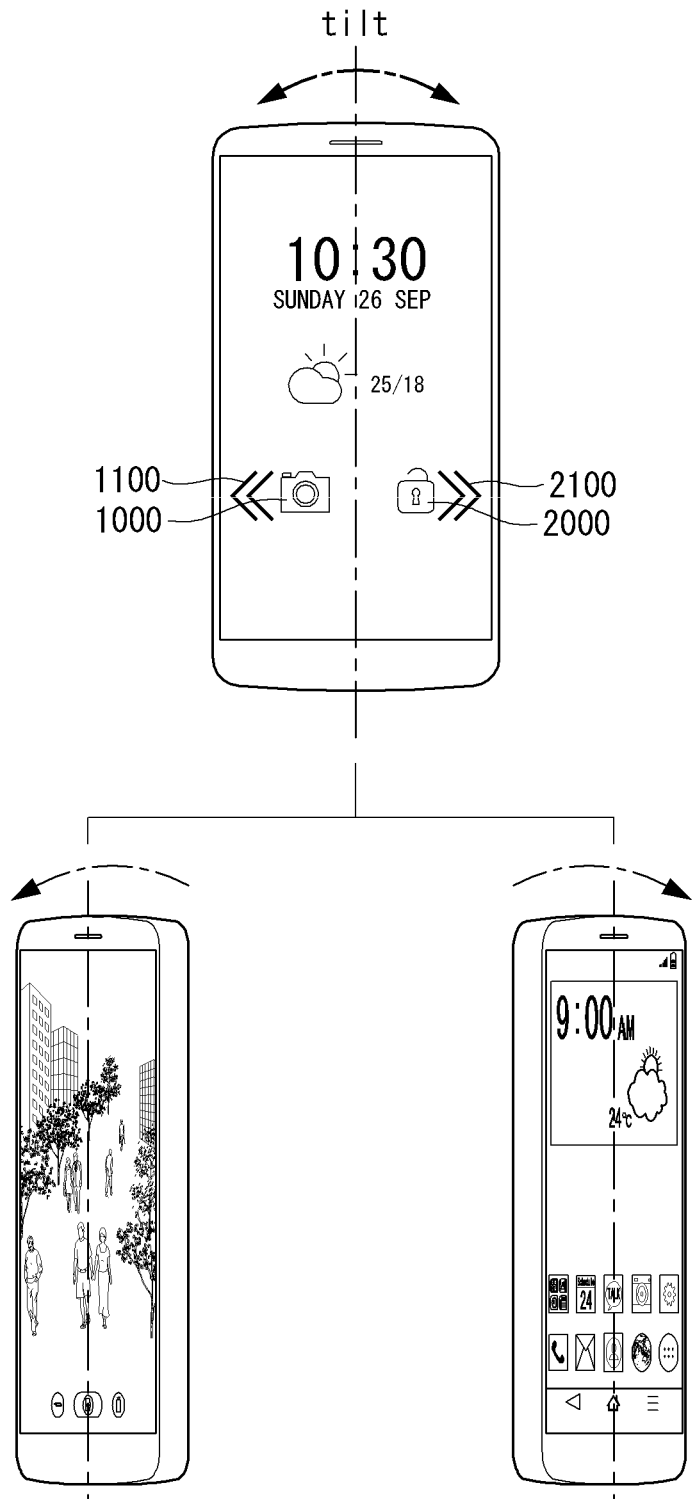
【Figure 18b】

【Figure 19】
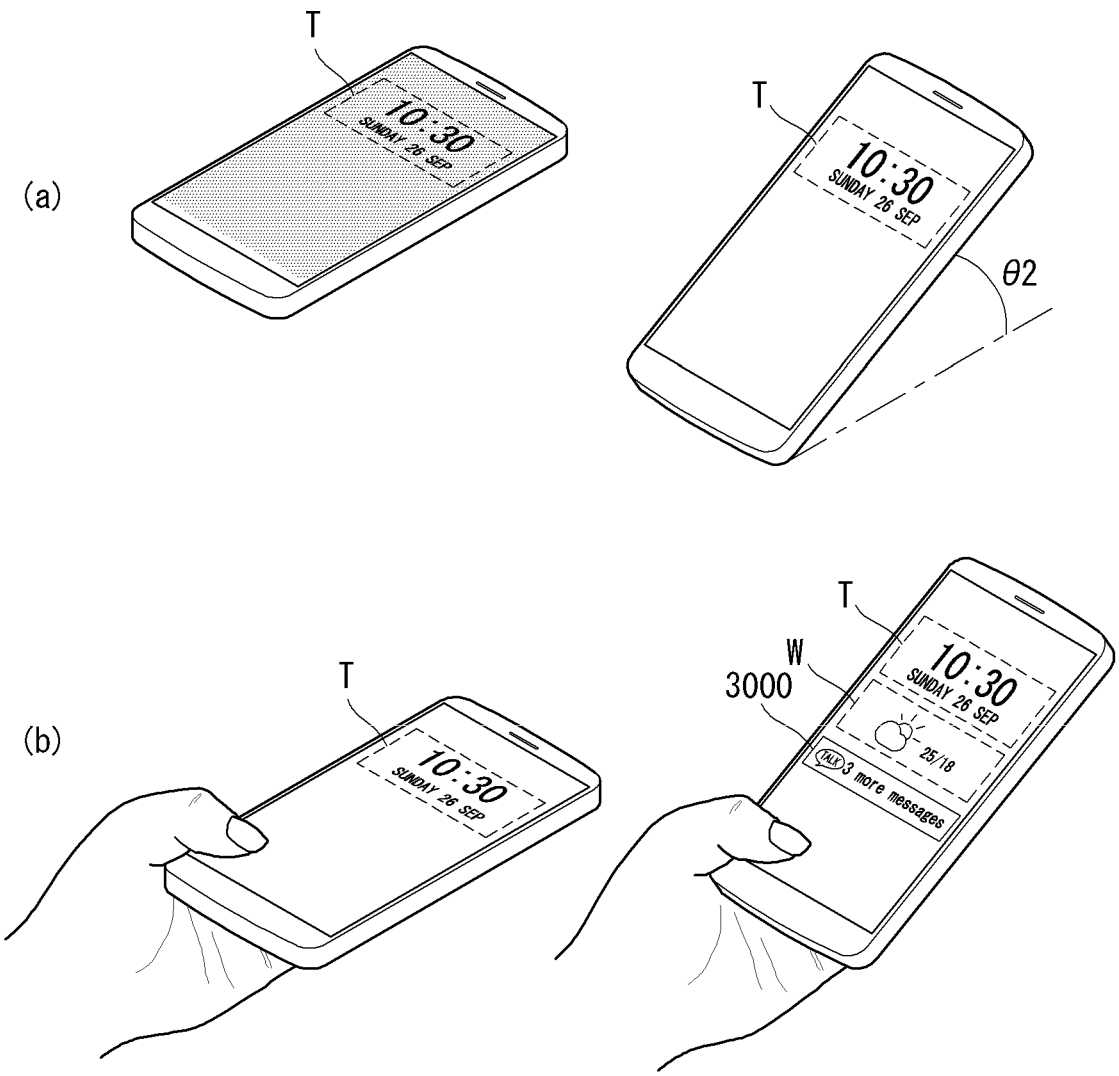

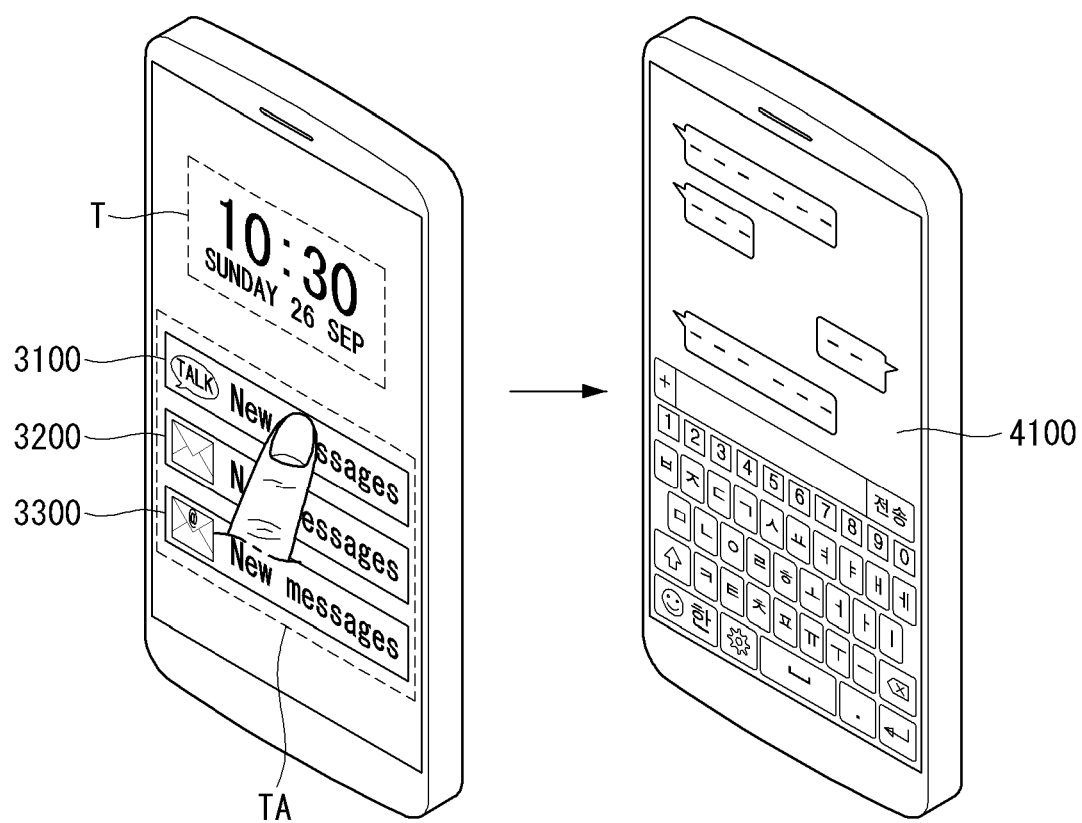
【Figure 20】

[Figure 21a]
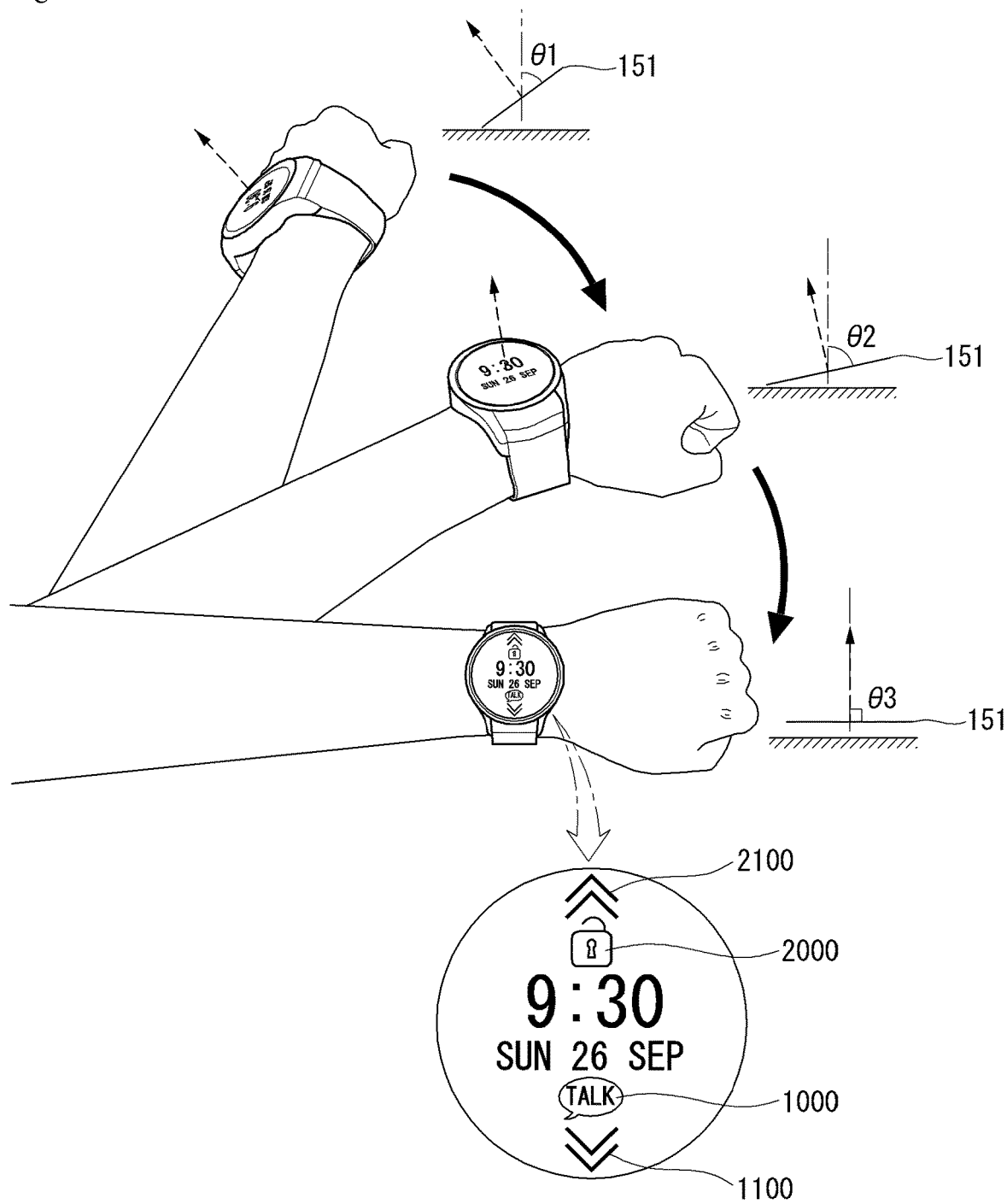

【Figure 21b】
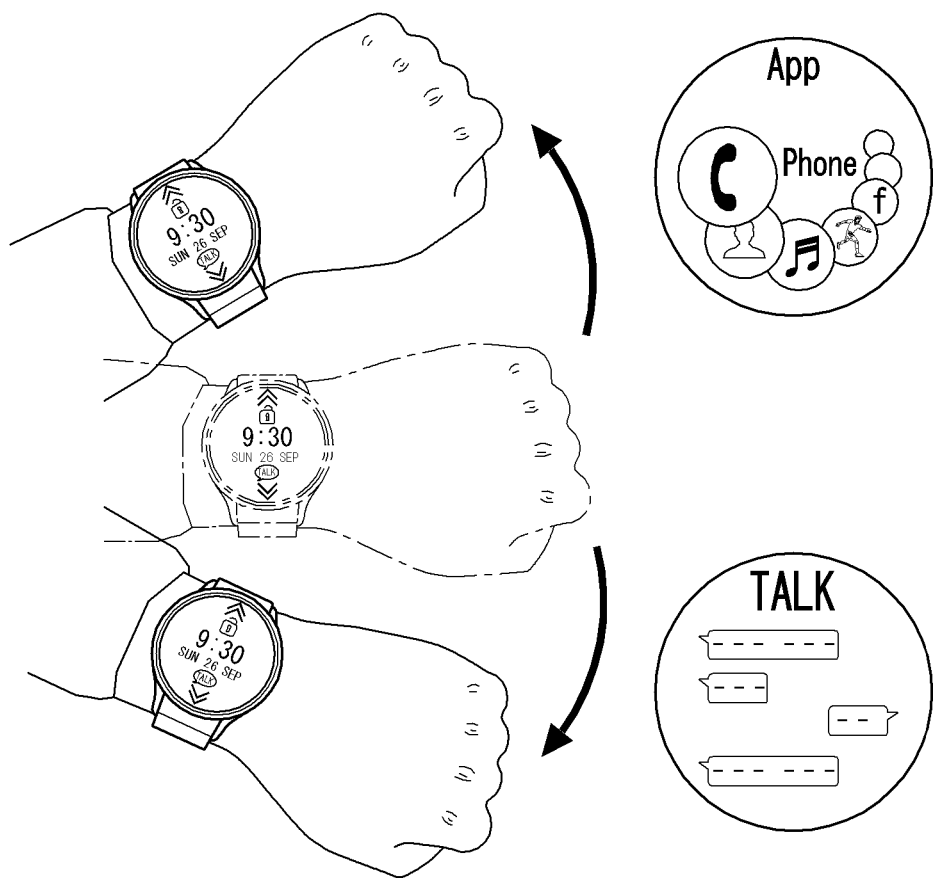

【Figure 22a】
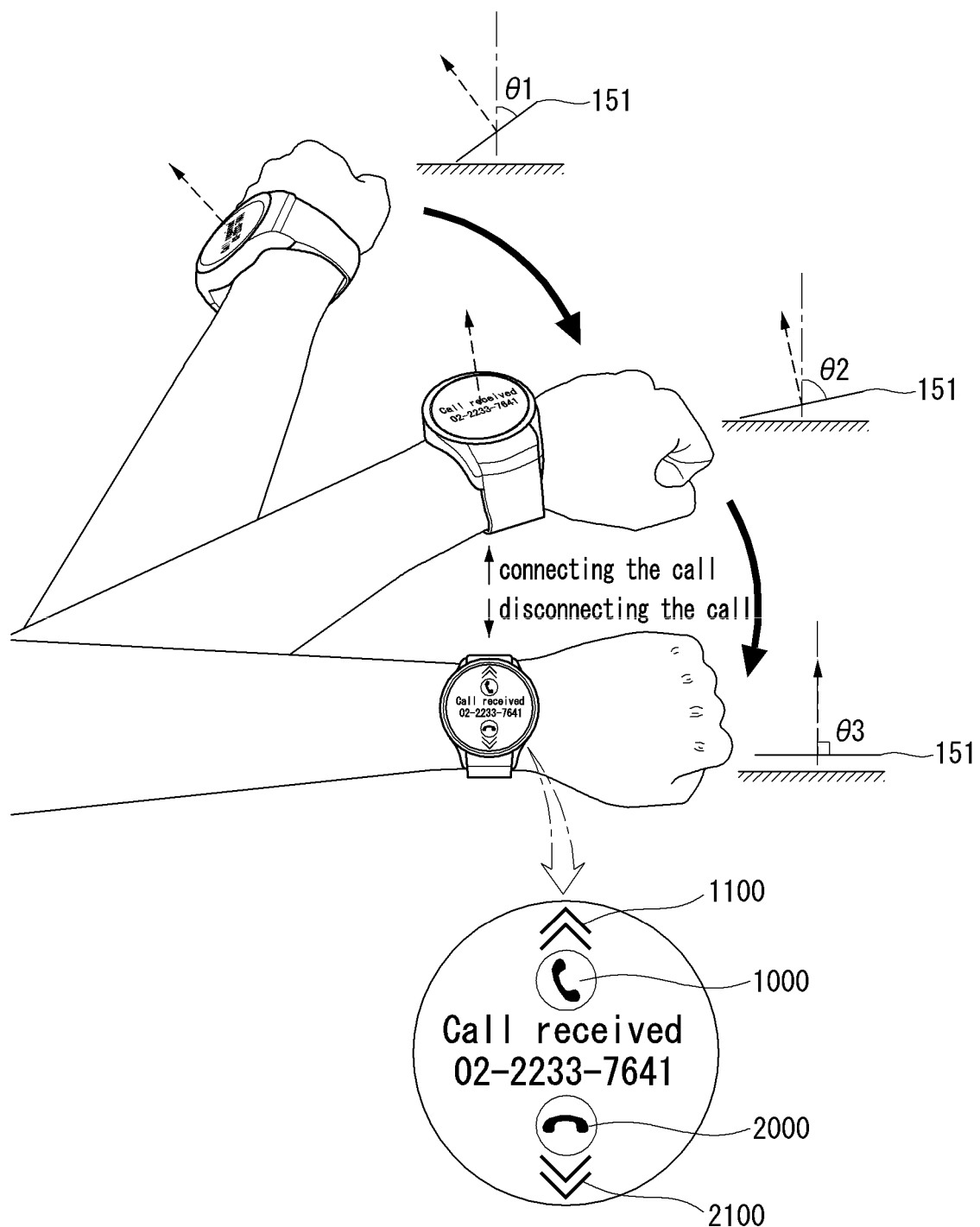

[Figure 22b]
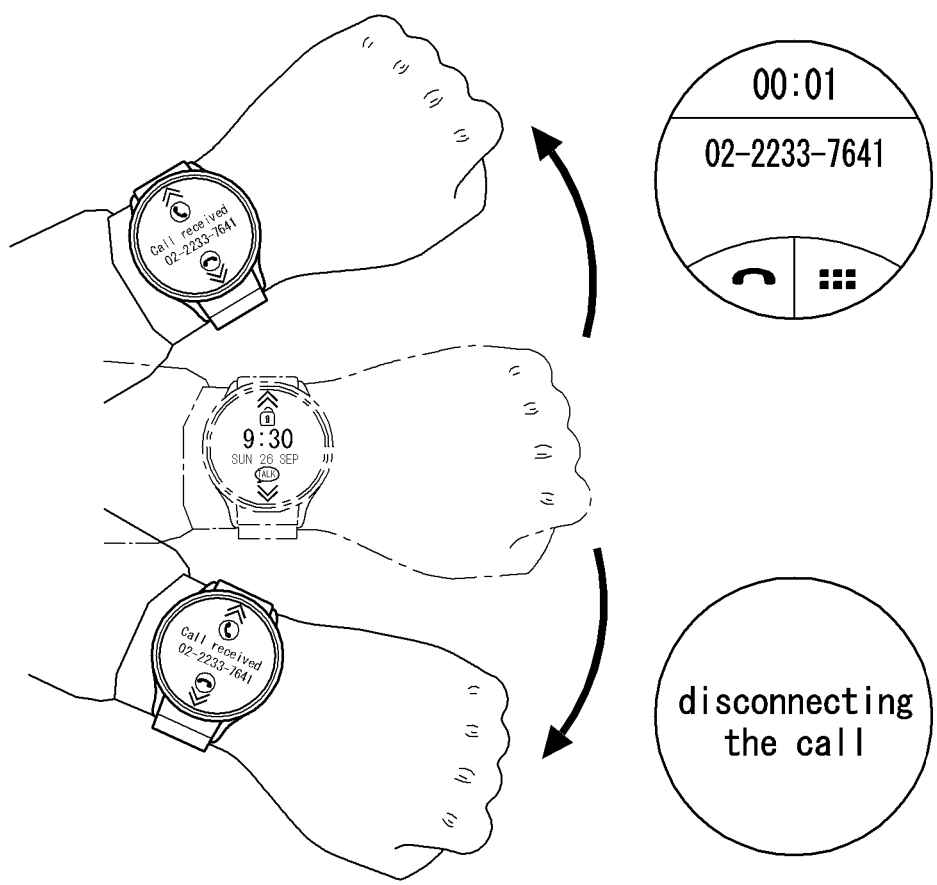

MOBILE TERMINAL

CROSS-REFERENCE TO RELATED APPLICATIONS

This application is the National Stage filing under 35 U.S.C. 371 of International Application No. PCT/KR2016/005518, filed on May 25, 2016, which claims the benefit of earlier filing date and right of priority to Korean Application Nos. 10-2015-0119403, filed on Aug. 25, 2015, and 10-2015-0127539, filed on Sep. 9, 2015, the contents of which are all hereby incorporated by reference herein in their entirety.

TECHNICAL FIELD

The present invention relates to a mobile terminal.

BACKGROUND ART

Mobile terminals can be divided into a mobile/portable terminal and a stationary terminal according to mobility. Further, mobile terminals can be divided into a handheld terminal and a vehicle mounted terminal according to user portability.

Functions of mobile terminals are diversified. For example, mobile terminals have functions of data and audio communication, photographing using a camera, capturing video, recording sound, reproducing music files using a speaker system and displaying images or video on a display. Some terminals additionally have an electronic game playing function or a multimedia player function. Particularly, recent mobile terminals can receive multicast signals providing visual content such as broadcast, video and TV programs.

As such terminals have become increasingly more functional, the terminals are implemented as multimedia players having functions including capturing images and video, playing music or video files, gaming, receiving broadcast, etc.

To support and increase the functionality of mobile terminals, improvement of structural components and/or software components of mobile terminals may be conceived.

DISCLOSURE

Technical Problem

An object of the present invention is to provide a mobile terminal providing a user interface through which the mobile terminal can be easily and efficiently controlled. In addition, an object of the present invention is to provide a mobile terminal capable of checking an event more efficiently when the event occurs in a situation in which a user cannot use hands freely on the phone.

Furthermore, an object of the present invention is to provide a mobile terminal capable of providing different pieces of information according to changes in the posture of a smart watch when a user wearing the smart watch (mobile terminal) is talking on the phone through a smartphone.

Moreover, an object of the present invention is to provide a mobile terminal capable of controlling checking and execution of an event occurring in a smartphone according to a change in the posture of the smart watch while the user wearing the smart watch (mobile terminal) is talking on the phone using the smartphone.

In addition, an object of the present invention is to provide a mobile terminal capable of providing information necessary for the smart watch according to a change in the posture of the smart watch (mobile terminal) while the user wearing the smart watch (mobile terminal) is talking on the phone using a smartphone to check necessary information in real time without terminating the call.

Furthermore, an object of the present invention is to provide a mobile terminal capable of controlling information to be provided to the smart watch according to input applied to a smartphone while the user wearing the smart watch (mobile terminal) is talking on the phone using the smartphone.

Moreover, an object of the present invention is to provide a mobile terminal capable of providing various usages by controlling different screens to be displayed on a display according to postures of the mobile terminal.

In addition, an object of the present invention is to provide a mobile terminal capable of providing a use guide according to the posture thereof to reflect a user's intention to use the mobile terminal.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

A mobile terminal according to one aspect of the present invention includes: a band connected to a body and configured to be worn on a user's wrist; a display unit provided to the front side of the body and configured to output information; a communication unit configured to perform communication with a paired external device; a posture sensing unit configured to sense a motion and posture of the body; and a controller configured to provide different types of information according to change in the posture of the body upon sensing the change in the posture of the body through the posture sensing unit when the external device responds to a received call in a state in which the mobile terminal is paired with the external device.

The posture sensing unit may include at least one of an acceleration sensor and a gyroscope, wherein the controller is configured to sequentially provide different types of information to the display unit when the posture sensing unit senses change in the posture of the mobile terminal from a first posture to a second posture.

The controller may be configured to display message reception notification information on the display unit when the posture of the mobile terminal is changed to the first posture in a state in which a call connection state of the external device and message reception of the external device in the call connection state have been sensed.

The controller may be configured to display at least some of the received message on the display unit when the posture of the mobile terminal is changed from the first posture to the second posture.

The mobile terminal may further include a microphone configured to receive voice input of a user, wherein the controller is configured to activate the microphone to activate a voice input mode, to speech-to-text (STT) convert voice input of the user input in the voice input mode into text and to display the converted text on the display unit when the posture of the mobile terminal is changed from the second posture to a third posture.

The controller may be configured to transmit a control signal to the external device when the voice input mode is activated, wherein the control signal is used to maintain the call connection state of the external device and to temporarily disconnect voice call.

The controller may be configured to terminate the voice input mode when the posture of the mobile terminal is changed from the third posture to one of the first posture and the second posture and to transmit a second control signal to the external device such that the external device resumes the voice call.

The controller may be configured to execute an application related to content of the call while the call connection state of the external device is maintained and to control information provided through the application according to posture change of the mobile terminal.

The controller may be configured to display a list including at least one application on the display unit upon sensing a change in the posture of the mobile terminal from the first posture to the second posture through the posture sensing unit while the call connection state of the external device is maintained, to select one application from the list on the basis of a control signal received from the external device and to execute the selected application.

When the user maintains the call connection state with the external device close to an ear, the second posture may be defined as a distance closer to the external device than the first posture and the third posture may be defined as a distance closer to the external device than the second posture.

A mobile terminal according to another aspect of the present invention includes: a touchscreen; a posture sensing unit configured to sense a posture of the mobile terminal; and a controller configured to provide different screens to the touchscreen according to the posture of the mobile terminal sensed through the posture sensing unit, wherein the controller is configured to display a tilting guide on the touchscreen when the posture of the mobile terminal is changed from the first posture to the second posture and to execute a predetermined function according to a tilting direction of the mobile terminal in the second posture.

The first posture may include a state in which the mobile terminal is substantially level with the ground and the second posture may include a state in which the mobile terminal forms a predetermined angle with respect to the ground.

The tilting guide may include a first object and a second object respectively corresponding to a first function and a second function executed according to motion of the mobile terminal, and the controller may be configured to execute the first function upon sensing a motion in a first tilting direction through the posture sensing unit and to execute the second function upon sensing a motion in the tilting direction.

The tilting guide may display an object indicating the first tilting direction in association with the first object and display an object indicating the second tilting direction in association with the second object.

The tilting direction may include at least one of a direction in which the body of the mobile terminal is tilted to the left or right on the basis of the vertical central axis, a direction in which the body of the mobile terminal is tilted forward or backward on the basis of the horizontal central axis of the mobile terminal, and a direction in which the mobile terminal is tilted to the left or right on the basis of one corner of the mobile terminal.

The controller may be configured to control the luminance of the touchscreen to increase as the angle between the mobile terminal and the ground increases.

The controller may be configured to control the quantity of information provided to the touchscreen to increase as the angle increases.

The controller may be configured to selectively control whether the touchscreen senses touch according to the posture of the mobile terminal, the controller activating a touch sensing state of at least part of the touchscreen when the angle between the mobile terminal and the ground exceeds a predetermined angle corresponding to the second posture.

The mobile terminal may include a watch-type mobile terminal including: a body; the touchscreen provided to the front side of the body; and a band connected to the body and configured to be worn on a user's wrist, wherein the first posture may include a state in which the touchscreen forms a predetermined angle with respect to the ground and the second posture may include a state in which the touchscreen is substantially perpendicular to the ground.

The tilting guide may include at least one object related to execution of an event occurring in the first posture of the touchscreen, and the controller may be configured to execute the first function upon sensing a motion in the first tilting through the posture sensing unit and to execute the second function upon sensing a motion in the second tilting direction in a state in which the tilting guide is displayed in the second posture.

Advantageous Effects

The present invention has the following advantages.

According to the present invention, it is possible to check an event more efficiently when the event occurs in a situation in which a user cannot use hands freely on the phone.

According to the present invention, it is possible to provide different pieces of information according to changes in the posture of a smart watch when a user wearing the smart watch (mobile terminal) is talking on the phone through a smartphone.

According to the present invention, it is possible to control checking and execution of an event occurring in a smartphone according to a change in the posture of the smart watch while the user wearing the smart watch (mobile terminal) is talking on the phone using the smartphone.

According to the present invention, it is possible to provide information necessary for the smart watch according to a change in the posture of the smart watch (mobile terminal) while the user wearing the smart watch (mobile terminal) is talking on the phone using a smartphone to check necessary information in real time without terminating the call.

According to the present invention, it is possible to control information to be provided to the smart watch according to input applied to a smartphone while the user wearing the smart watch (mobile terminal) is talking on the phone using the smartphone.

According to the present invention, it is possible to provide various usages by controlling different screens to be displayed on a display according to postures of the mobile terminal.

According to the present invention, it is possible to provide a use guide according to the posture thereof to reflect a user's intention to use the mobile terminal.

DESCRIPTION OF DRAWINGS

FIG. 1a is a block diagram of a mobile terminal in accordance with the present invention.

FIGS. 1*b* and 1*c* are conceptual views of one example of the mobile terminal, viewed from different directions.

FIG. 2 is a perspective view showing one example of a watch-type mobile terminal 300 according to another embodiment of the present invention.

FIG. 3 illustrates an operating environment of a watch-type mobile terminal according to one embodiment of the present invention.

FIG. 4 is a flowchart of a method of controlling a mobile terminal according to a first embodiment of the present invention.

FIGS. 5*a* to 6 are diagrams for describing an example in which the method of controlling a mobile terminal according to the first embodiment of the present invention is realized.

FIG. 7 is a flowchart of a method of controlling a mobile terminal according to a second embodiment of the present invention.

FIGS. 8*a* to 8*e* are diagrams for describing an example in which the method of controlling a mobile terminal according to the second embodiment of the present invention is realized.

FIG. 9 is a diagram for describing changes in the posture of the mobile terminal described in embodiments of the present invention.

FIG. 10 is a flowchart of a method of controlling a mobile terminal according to a third embodiment of the present invention.

FIGS. 11*a* to 11*c* are diagrams for describing an example in which the method of controlling a mobile terminal according to the third embodiment of the present invention is realized.

FIG. 12 is a flowchart of a method of controlling a mobile terminal according to a fourth embodiment of the present invention.

FIGS. 13*a* and 13*b* are diagrams for describing an example in which the method of controlling a mobile terminal according to the fourth embodiment of the present invention is realized.

FIG. 14 is a flowchart of a method of controlling a mobile terminal according to a fifth embodiment of the present invention.

FIG. 15 is a diagram for describing changes in the posture of the mobile terminal according to the fifth embodiment of the present invention.

FIG. 16 illustrates an example of providing different screens to a display when the posture of the mobile terminal is changed according to the fifth embodiment of the present invention.

FIG. 17 illustrates an example of the posture of the mobile terminal when a tilting guide is provided according to the fifth embodiment of the present invention.

FIGS. 18*a* and 18*b* are diagrams for describing an example of executing different functions depending on tilting directions of the mobile terminal according to the method of controlling a mobile terminal according to the fifth embodiment of the present invention.

FIG. 19 illustrates another example of providing different screens to a display when the posture of the mobile terminal is changed according to the fifth embodiment of the present invention.

FIG. 20 is a diagram for describing an example of differently controlling a touch sensing state when the posture of the mobile terminal is changed according to a sixth embodiment of the present invention.

FIGS. 21*a* to 22*b* are diagrams for describing a method of controlling a mobile terminal according to a seventh embodiment of the present invention.

MODE FOR INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smartphones, user equipment, laptop computers, digital broadcast terminals, personal digital assistants (PDAs), portable multimedia players (PMPs), navigators, portable computers (PCs), slate PCs, tablet PCs, ultra-books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

FIG. 1*a* is a block diagram of a mobile terminal in accordance with the present invention and FIGS. 1*b* and 1*c* are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the components illustrated in FIG. 1a is not a requirement, and that greater or fewer components may alternatively be implemented.

More specifically, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located. The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

The wireless communication unit 110 may include one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, and the like) for allowing a user to input information. Data or image data is obtained by the input unit 120 and may be analyzed and processed into control commands of a user.

The sensing unit 140 is typically implemented using one or more sensors configured to sense internal information of the mobile terminal, the surrounding environment of the mobile terminal, user information, and the like. For example, the sensing unit 140 is shown having a proximity sensor 141 and an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touchscreen. The touchscreen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. The memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components described above, or activating application programs stored in the memory 170.

In addition, the controller 180 controls some or all of the components illustrated in FIG. 1a according to the execution of an application program that have been stored in the memory 170. Furthermore, the controller 180 may combine and operate at least two of components included in the mobile terminal 100 to execute the application program.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the aforementioned components may cooperatively operate to realize operation and control of the mobile terminal or a method of controlling the same according to various embodiments which will be described below. In addition, operation and control of the mobile terminal or a method of controlling the same may be realized according to execution of at least one application program stored in the memory 170.

The aforementioned components will be described in more detail with reference to FIG. 1a prior to description of various embodiments realized through the aforementioned mobile terminal 100.

Regarding the wireless communication unit 110, the broadcast receiving module 111 is typically configured to receive a broadcast signal and/or broadcast associated information from an external broadcast managing entity via a broadcast channel. The broadcast channel may include a satellite channel and a terrestrial channel. Two or more broadcast receiving modules may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals include audio call signals, video telephony call signals and/or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access.

The short-range communication module 114 is configured to facilitate short-range communications. Suitable technologies for implementing such short-range communications include Bluetooth™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module or a Wi-Fi module. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 is used to acquire a position (or current position) of the mobile terminal and is not limited to a module which directly calculates or acquires the position of the mobile terminal.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. The microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touchscreen through software processing, or a touch key which is located on the mobile terminal at a location that is other than the touchscreen. On the other hand, the virtual key or the visual key may be displayed on the touchscreen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touchscreen, or near the touchscreen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touchscreen is implemented as a capacitance type, the proximity sensor 141 can sense proximity of a pointer relative to the touchscreen by changes of an electromagnetic field, which is responsive to an approach of an object with conductivity. In this case, the touchscreen (touch sensor) may also be categorized as a proximity sensor.

The term "proximity touch" will often be referred to herein to denote the scenario in which a pointer is positioned to be proximate to the touchscreen without contacting the touchscreen. The term "contact touch" will often be referred to herein to denote the scenario in which a pointer makes physical contact with the touchscreen. For the position corresponding to the proximity touch of the pointer relative to the touchscreen, such position will correspond to a position where the pointer is perpendicular to the touchscreen. The proximity sensor 141 may sense proximity touch, and proximity touch patterns (for example, distance, direction, speed, time, position, moving status, and the like). In general, controller 180 processes data (or information) corresponding to proximity touches and proximity touch patterns sensed by the proximity sensor 141, and cause output of visual information on the touchscreen. In addition, the controller 180 can control the mobile terminal 100 to execute different operations or process different data according to whether a touch with respect to a point on the touchscreen is either a proximity touch or a contact touch.

A touch sensor can sense a touch (or touch input) applied to the touchscreen (or the display unit 151) using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touchscreen (or a touch key provided in addition to the touchscreen). Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

A posture sensor 143 may sense motion information such as presence or absence of motion of the mobile terminal, and a distance, speed, acceleration and direction of the motion and/or posture information such as an angle at which the mobile terminal 100 tilts from a predetermined rotation axis.

The posture sensor 143 may include at least one acceleration sensor, at least one gyroscope or a sensing signal processor (not shown) which compensates for a sensing value or converts sensing information.

The posture sensor 143 may acquire information on a linear motion, a rotating motion and shaking of the mobile terminal 100 on the basis of acceleration sensed through various sensors. An acceleration sensor senses a motion of the mobile terminal 100, acquires the acceleration of the motion and detects information about presence or absence, distance, speed, acceleration, direction and the like of motion of the mobile terminal 100.

In addition, the gyroscope may sense rotation of the mobile terminal 100 to acquire rotating amount. The acceleration sensor may represent a sensed acceleration as vector values with respect to 3 axes (X, Y and Z axes) and the gyroscope may represent a sensed acceleration as rotation vector values (roll, pitch and yaw) with respect to 3 axes. The posture sensor 143 can detect the speed, location and location change of the mobile terminal 100 by including the acceleration sensor and the gyroscope. The posture sensor 143 may be a general inertial navigation system (INS) and the gyroscope may be an optical, mechanical or piezoelectric gyroscope.

The sensing signal processor (not shown) may convert analog signals output from the acceleration sensor and the gyroscope into digital signals, integrate the converted signals and then track trajectory to convert the signals into motion information, angle information, shaking information, etc.

Although the posture sensor including the acceleration sensor and the gyroscope to acquire a posture and a motion of the mobile terminal 100 according to one embodiment of the present invention has been described, the present invention is not limited thereto and any sensor can be used to acquire motion and posture information of the mobile terminal 100 within a range within which the objects of the present invention can be accomplished.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touchscreen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various types of information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touchscreen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touchscreen as characters or images, respectively. In addition, the controller 180 can control one or a combination of those components in order to implement various exemplary embodiments disclosed herein.

The power supply unit 190 receives external power or provides internal power and supplies the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1b and 1c, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal. However, such teachings with regard to a particular type of mobile terminal will generally apply to other types of mobile terminals as well.

Here, a terminal body may be understood as a concept referring to the mobile terminal 100 regarded as an assembly.

The mobile terminal 100 will generally include a case (for example, frame, housing, cover, and the like) forming the appearance of the terminal. As shown, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. A rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon coupling, the rear case 102 may also be completely shielded by the rear cover 103. In some embodiments, the rear cover 103 may include an opening for exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases forms an inner space for accommodating components, the mobile terminal 100 may be configured such that one case forms the inner space. In this example, a unibody mobile terminal 100 is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when the cases are coupled.

The mobile terminal 100 may include the display unit 151, first and second audio output units 152a and 152b, the proximity sensor 141, the illumination sensor 142, the optical output unit 154, first and second cameras 121a and 121b, first and second manipulation units 123a and 123b, the microphone 122 and the interface unit 160.

In the following, an example in which the display unit 151, the first audio output unit 152a, the proximity sensor 141, the illumination sensor 142, the optical output unit 154, the first camera 121a and the first manipulation unit 123a are arranged on the front side of the terminal body, the second manipulation unit 123b, the microphone 122 and the interface unit 160 are arranged at the side of the terminal body, and the second audio output unit 152b and the second camera 121b are arranged on the rear side of the terminal body, as shown in FIGS. 1b and 1c, will be exemplified.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 displays (outputs) information processed in the mobile terminal 100. For example, the display unit 151 may display information on execution screens of application programs executed in the mobile terminal 100 or user interface (UI) and graphic user interface (GUI) information with respect to such execution screen information.

The display unit 151 may include at least one of a liquid crystal display (LCD), a thin film transistor-liquid crystal display (TFT-LCD), an organic light emitting diode (OLED), a flexible display, a 3-dimensional (3D) display, and an e-ink display.

The display unit 151 may be implemented using two display devices, which can implement the same or different display technology. For instance, a plurality of display units 151 may be arranged on one side, either spaced apart from each other, or these devices may be integrated, or these devices may be arranged on different surfaces.

The display unit 151 may also include a touch sensor which senses touch input received by the display unit. When touch is input to the display unit 151, the touch sensor may be configured to sense such touch and the controller 180, for example, may generate a control command or other signals corresponding to the touch. The content which is input in the touching manner may be text or a numerical value, or a menu item which can be indicated or designated in various modes.

The touch sensor may be configured in the form of a film having a touch pattern, disposed between the window 151a and a display (not shown) on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touchscreen together with the touch sensor. In this case, the touchscreen may serve as the user input unit 123 (see FIG. 1a). Therefore, the touchscreen may replace at least some of the functions of the first manipulation unit 123a.

The first audio output module 152a may be implemented in the form of a receiver to output voice audio, alarm sounds, multimedia audio reproduction, and the like.

The window 151a of the display unit 151 will typically include an aperture to permit audio generated by the first audio output module 152a to pass therethrough. One alternative is to allow audio to be emitted through an assembly gap between the structural bodies (for example, a gap between the window 151a and the front case 101). In this case, a hole independently formed to output audio may not be seen or is otherwise hidden in terms of appearance, thereby further simplifying the appearance and manufacture of the mobile terminal 100.

The optical output unit 154 can be configured to output light for indicating event generation. Examples of such events include message reception, call signal reception, a missed call, an alarm, a schedule notice, email reception, information reception through an application, and the like. When a user has checked a generated event, the controller can control the optical output unit 154 to stop light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1b illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate the rear input unit using a forefinger when the user grabs the terminal body with one hand. Alternatively, the rear input unit can be positioned at any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting reception of stereo sound.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), a User Identity Module (UIM), or a memory card for information storage.

The second camera 121b is shown located at the rear side of the terminal body and includes an image capturing direction that is substantially opposite to the image capturing direction of the first camera unit 121a.

The second camera 121*b* can include a plurality of lenses arranged along at least one line. The plurality of lenses may also be arranged in a matrix. The cameras may be referred to as an "array camera." When the second camera 121*b* is implemented as an array camera, images may be captured in various manners using the plurality of lenses and images with better qualities.

A flash 124 is shown adjacent to the second camera 121*b*. When an image of a subject is captured with the camera 121*b*, the flash 124 may illuminate the subject.

The second audio output module 152*b* can be located on the terminal body. The second audio output module 152*b* may implement stereophonic sound functions in conjunction with the first audio output module 152*a*, and may be also used to implement a speakerphone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the functionality of the mobile terminal 100. Another example of the accessory is a stylus for assisting or extending touch input to a touchscreen.

FIG. 2 is a perspective view illustrating one example of a watch-type mobile terminal 300 in accordance with another exemplary embodiment.

As illustrated in FIG. 2, the watch-type mobile terminal 300 includes a main body 301 with a display unit 351 and a band 302 connected to the main body 301 to be wearable on a wrist. In general, the mobile terminal 300 may be configured to include features that are the same or similar to those of the mobile terminal 100 of FIGS. 1*a* to 1*c*.

The main body 301 may include a case having a certain appearance. As illustrated, the case may include a first case 301*a* and a second case 301*b* cooperatively defining an inner space for accommodating various electronic components. Other configurations are possible. For instance, a single case may alternatively be implemented, with such a case being configured to define the inner space, thereby implementing a unibody mobile terminal 300.

The watch-type mobile terminal 300 can perform wireless communication, and an antenna for wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable by a user. In some embodiments, the display unit 351 includes a touch sensor so that the display unit can function as a touchscreen. As illustrated, a window 351*a* is positioned on the first case 301*a* to form a front surface of the terminal body together with the first case 301*a*.

The illustrated embodiment includes an audio output module 352, a camera 321, a microphone 322, and a user input unit 323 positioned on the main body 301. When the display unit 351 is implemented as a touchscreen, additional function keys may be minimized or eliminated. For example, when the touchscreen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to user preference.

In one configuration, the band 302 may be used to extend the performance of the antenna. For example, the band may include therein a ground extending portion (not shown) electrically connected to the antenna to extend a ground area.

The band 302 may include a fastener 302*a*. The fastener 302*a* may be implemented as a buckle type, a snap-fit hook structure, a Velcro® type, or the like, and include a flexible section or material. The drawing illustrates an example in which the fastener 302*a* is implemented using a buckle.

FIG. 3 illustrates an operating environment of a mobile terminal according to one embodiment of the present invention.

The mobile terminal according to one embodiment of the present invention may be the watch-type mobile terminal shown in FIG. 2 and an external device described in the present description may be a portable terminal paired with the watch-type mobile terminal.

With reference to FIG. 3, in a personal radio environment 10 where the watch-type mobile terminal is operating, users of a plurality of electronic devices are allowed to use the watch-type mobile terminal 100 to display or receive particular information.

The personal radio environment 10 can be activated so that users of the watch-type mobile terminal 100 can interact with a mobile phone 200, a portable computer 210, a desktop computer 220 and/or another watch-type mobile terminal 230. Interaction with the watch-type mobile terminal 100 can be carried out in a wired or wireless manner. For user convenience, the watch-type mobile terminal 100 supports radio interaction with at least one electronic device among one or more external electronic devices 200, 210, 220, 230. At this time, the watch-type mobile terminal 100 can use a pico-net formed among neighboring external electronic devices.

In the following, pairing between the watch-type mobile terminal 100 and an external mobile terminal 200 according to one embodiment of the present invention will be described. For convenience of description, the watch-type mobile terminal 100 is called a smart watch 100, and the external mobile terminal 200 is called a smartphone 200.

The smartphone 200 can correspond to a digital device capable of connecting to the smart watch 100 for communication.

Pairing can refer to connection between the smart watch 100 and the smartphone 200 for data transmission and reception. The smart watch 100 and the smartphone 200 can carry out bilateral data transmission and reception by establishing a connection for communication. Pairing can be implemented using Bluetooth or Near Field Communication (NFC). As one example, pairing can be carried out through a user input at the smart watch 100 or the smartphone 200. The user input can be obtained through a separate button prepared for communication or through a user interface.

Once communication is established, the smart watch 100 is able to carry out data communication with the smartphone 200 while a session is open. Meanwhile, the smart watch 100 can perform selective data communication with a plurality of external electronic devices 200, 210, 220, 230 by pairing with the plurality of external electronic devices.

Detecting a paired smartphone 200, the smart watch 100 can provide notification about an event generated from the smartphone 200. The event denotes a change of state generated from the smartphone 200, including reception of a call, text, SNS message, schedule notification, and weather notification. Meanwhile, notification of the event generated from the smartphone 200 is intended to inform the user of the aforementioned event, which can be displayed in the form of text, voice, or vibration.

In one embodiment of the present invention, a predetermined call can be received while the smart watch 100 is paired with the smartphone 200. At this time, the smart watch 100 can have the same phone number as the smartphone 200. If the smartphone 200 receives a call while the two devices are paired with each other, the received call is also delivered to the smart watch 100, and the smart watch 100 can notify the user of the call reception through bell sound or vibration.

Meanwhile, even if call identification numbers of the two devices differ from each other, the smart watch 100 can still be notified of a received call in case that the smartphone 200 receives the call as long as the two devices are paired with each other.

In what follows, various embodiments of the present invention will be described wherein the smart watch 100 is worn by the user on the wrist for most cases, and in case a predetermined event is generated from the smartphone 200 but the user is unable to check the event directly from the smartphone 200, the generated event can still be controlled more conveniently through the smart watch 100.

FIG. 4 is a flowchart of a method of controlling a mobile terminal according to a first embodiment of the present invention. FIGS. 5a to 6 are diagrams for describing an example in which the method of controlling a mobile terminal according to the first embodiment of the present invention is realized.

The method of controlling a mobile terminal according to the first embodiment of the present invention may be realized in the mobile terminals 100 and 300 described with reference to FIGS. 1a to 3. The method of controlling a mobile terminal according to the first embodiment of the present invention and operations of the mobile terminals 100 and 300 for realizing the same will be described in detail below with reference to the attached drawings.

Referring to FIG. 4, the mobile terminal 100 may be paired with an external device 200 for short-range communication (S10).

Pairing may be performed in such a manner that the external device 200 searches for the mobile terminal 100 or the mobile terminal 100 searches for the external device. When pairing is released after being initially performed, the pairing function may be automatically executed if the two devices are located within a predetermined distance when the pairing function is activated.

The external device 200 receives a call (S11).

When the external device 200 receives a call in a state in which the mobile terminal 100 is paired with the electronic device 20 as described above, a call reception notification may be provided to the external device 200 (S12). The call reception notification may be simultaneously provided to the mobile terminal 100 (S12 and S100). The call reception notification is display of a pre-call connection screen on the display unit and a bell sound or a vibration signal may be output along with the call reception notification.

The call reception notification may be provided to only one of the two devices according to setting environment.

The call received by the external device 200 may be connected in a situation in which the call reception notification is provided to both the mobile terminal 100 and the external device 200 (S13). Then, the controller 180 may stop provision of the call reception notification to the mobile terminal 100 (S110).

Referring to FIGS. 5a and 5b, when the external device 200 receives a call, a call reception notification screen including a call-waiting screen A2 can be provided to the display unit. The call-waiting screen A2 may include a call reception object 1 and a call rejection object 2. Further, the call reception notification screen A1 may also be provided to the mobile terminal 100. When the received call is connected upon selection of the call reception object 1 in the external device 200, the external device 200 provides a call connection screen to the display unit, provision of the call reception notification to the mobile terminal 100 is terminated, and a home screen HS is displayed on the display unit of the mobile terminal 100, as shown in FIG. 5b. In this case, the user may be talking on the phone through the external device 200 gripped by the right hand H2 and may wear the mobile terminal 100 on the left hand H1.

Through the above-described process, the mobile terminal paired with the external device 200 can confirm that the call is connected through the external device 200.

The controller 180 senses a change in the posture of the mobile terminal 100 (S120) while the call is connected in the external device 200 (S14).

The change in the posture of the mobile terminal 100 may be confirmed through a posture sensing unit of the mobile terminal 100. The posture sensing unit may include at least one of an acceleration sensor and a gyroscope as described above with reference to FIG. 1a. The controller 180 may sense a change in the posture of the mobile terminal 100 from a first posture to a second posture through the posture sensing unit.

The controller 180 may control information provided to the display unit 151 to be varied according to change in the posture of the mobile terminal 100. An example in which information provided to the display unit 151 of the mobile terminal 100 is varied when the posture of the mobile terminal 100 changes from the first posture to the second posture while a call connection state is maintained in the external device 200 will be described with reference to FIG. 6.

Referring to FIG. 6, the user may be talking on the phone with the external device 200 gripped by one hand H1. The posture of mobile terminal 100 worn on the other hand H2 may be changed from a first posture P1 to a third posture P3 through a second posture P2 while call connection is maintained in the external device 200.

The controller 180 may sense posture change of the mobile terminal 100 through the posture sensing unit 143 described above with reference to FIG. 1a.

Here, the first posture may refer to a posture of the mobile terminal 100 (smart watch) worn by the user before the call reception notification is provided.

The second posture may refer to a posture of the mobile terminal 100 which is defined when the user raises the arm on which the mobile terminal 100 is worn toward the body of the user while a call is connected through the external device 200 after the call reception notification is provided. The distance between the mobile terminal 100 and the external device 200 in the second posture may be shorter than that in the first posture.

The third posture may refer to a posture of the mobile terminal 100 which is defined when the user raises the arm on which the mobile terminal 100 is worn closer to the body of the user in the second posture. The distance between the mobile terminal 100 and the external device 200 in the third posture may be shorter than that in the second posture.

Referring to FIG. 6, the controller 180 may maintain the first posture P1 before the external device 200 receives a call. Basic information 10 such as a date, time, weather and battery capacity may be displayed on the touchscreen 151 in the first posture P1. The controller 180 may adjust the luminance of the touchscreen 151 of the mobile terminal 100 to a low level to control the mobile terminal 100 to operate at low power while the mobile terminal 100 remains in the first posture P1. In this case, the controller 180 may automatically control environment settings of the mobile terminal 100 such that the mobile terminal 100 operates at low power upon determining that the user does not intend to use the mobile terminal 100.

Upon sensing a change in the posture of the mobile terminal 100 from the first posture P1 to the second posture P2 while the external device 200 maintains the call, the controller 180 may add unconfirmed event information 20 to the information displayed on the display unit 151 in the first posture and display the information.

Upon sensing a change in the posture of the mobile terminal 100 from the second posture P2 to the third posture P3, the controller 180 may provide a list of at least one unconfirmed event 21, 22, 23 and 24 to the display unit 151 such that the user can confirm unconfirmed events displayed in the second posture P2. The unconfirmed event is an event occurring in the external device 200 and may be an event which is not confirmed in the external device or the mobile terminal 100. The unconfirmed event may include an unanswered call, an unconfirmed text message, etc.

When the mobile terminal 100 returns to the second posture P2 or the first posture P1 from the third posture P3, the controller 180 may return the screen displayed on the display unit 151 to the screen provided in the first posture P1.

FIG. 7 is a flowchart of a method of controlling a mobile terminal according to a second embodiment. FIGS. 8a to 8e are diagrams for describing an example in which the method of controlling a mobile terminal according to the second embodiment is realized.

The method of controlling a mobile terminal according to the second embodiment of the present invention may be realized in the mobile terminals 100 and 300 described with reference to FIGS. 1a to 3. The method of controlling a mobile terminal according to the second embodiment of the present invention and operations of the mobile terminal 100 or 300 for realizing the same will be described in detail below with reference to the attached drawings. The second embodiment of the present invention may be realized on the basis of the first embodiment.

Referring to FIG. 7, the mobile terminal 100 may be paired with the external device 200 (S10). Step S10 is the same as that in the first embodiment of the present invention.

The external device 200 may receive a call and connect the call in a state in which the external device 200 is paired with the mobile terminal 100 (S13). When the external device 200 connects the call, the external device 200 may be synchronized with the mobile terminal 100 paired therewith such that the mobile terminal 100 can recognize that the external device 200 connects the call.

The external device 200 may receive a message during call connection (S20).

When the external device 200 receives a message, the mobile terminal paired therewith can recognize reception of the message through a notification signal.

The controller 180 may sense posture change (S200).

That is, the controller 180 senses a change in the posture of the smart watch 100 worn by the user in a state in which a message reception event occurs in the external device 200 while the user is talking on the phone with the external device 200 gripped by one hand.

The mobile terminal 100 may sense a change in the posture of the mobile terminal 10 from the first posture to the third posture through the second posture through the posture sensing unit.

Referring to FIG. 8a, the user is talking on the smartphone 200 gripped by one hand H1 holding the smartphone 200 to their ear and wearing the smart watch 200 on the other hand H2. The hand H2 on which the smart watch 200 is worn may be naturally positioned in a comfortable position. Information displayed on the display unit 151 of the smart watch 100 in this state may include the basic information 10 or a pop-up window 10b indicating that a call is connected in the external device 200.

The controller 180 may sense reception of a message during call connection in the external device 200. In this state, the controller 180 may sense a change in the posture of the mobile terminal 100 to the first posture. That is, the first posture may be a posture when the user performs a gesture of bending the arm on which the mobile terminal 100 is worn at a predetermined angle from a state in which the arm is unfolded. The mobile terminal 100 may provide a message reception notification window 40 to the display unit 151 in the first posture. That is, the user can check whether a message is received by moving the hand on which the smart watch is worn while talking on the smartphone gripped by one hand.

Referring back to FIG. 7, upon sensing a change in the posture of the mobile terminal 100 from the first posture to the second posture, the controller 180 may provide more detailed information on the message than the message reception notification window provided to the display unit 151 in the first posture to the display unit 151.

Referring to FIG. 8b, the user may perform a gesture of bending the arm on which the mobile terminal 100 is worn toward their body in the first posture to place the mobile terminal 100 in the second posture. The controller 180 may display at least some 41, 42 and 43 of the received message on the display unit 151 upon sensing a change in the posture of the mobile terminal 100 from the first posture to the second posture.

The at least some of the received message may include message sender information 41 and 42 and at least some 43 of the message text.

Referring back to FIG. 7, the controller 180 may activate a voice input mode upon sensing a change in the posture of the mobile terminal 100 from the second posture to the third posture (S230).

Referring to FIG. 8c, the third posture may refer to a posture when the mobile terminal 100 is positioned very close to the user's face. That is, the third posture may include a posture of the mobile terminal 100 at a position at which user voice can be input through the microphone of the mobile terminal 100. Accordingly, the third posture may be a state in which the bending angle of the user's arm is narrower than that in the second posture.

The controller 180 may activate the voice input mode by turning on the microphone included in the mobile terminal 100. The controller 180 may indicate that the voice input mode has been activated by displaying a microphone object 45 on the display unit 151 in the voice input mode. In the voice input mode, voice input can be received from a user U1.

The controller 180 may transmit a control signal for temporarily suspending a voice call in the external device 200 to the external device 200 simultaneously with activation of the voice input mode. Upon reception of the control signal, the external device 200 may temporarily block a voice transfer path such that the user voice is not delivered to the other party (S21).

Accordingly, user voice can be prevented from being input to the smartphone 200 while voice is input through the smart watch 100 in the activated voice input mode of the smart watch 100.

The controller 180 may receive voice input in the voice input mode (S240). Voice input in the voice input mode may be converted into text (STT conversion) and displayed on the display unit 151. In addition, the controller 180 may transmit the STT-converted text to a terminal that has transmitted the message in response to the received message (S250).

The external device 200 may maintain the call with the other party when the mobile terminal 100 sends a response to the message in the voice input mode.

Referring to FIG. 8d, the STT-converted text may be displayed on the display unit 151. In addition, the external device 200 may send a hold7 message to the other party while the voice input mode is activated in the mobile terminal 100.

The controller 180 may terminate the voice input mode upon sensing a change in the posture of the mobile terminal 100 from the third posture to the second posture or the first posture (S260).

The controller 180 may transmit a control signal to the external device 200 simultaneously with termination of the voice input mode. The control signal may include a signal for resuming a voice call that is on hold in the external device 200.

Referring to FIG. 8e, the controller 180 may control the external device 200 to resume the call and provide a pop-up window for indicating termination of message transmission on the display unit 151 of the mobile terminal 100 upon sensing a change in the posture of the mobile terminal 100 from the third posture to the first posture.

In the above-described embodiments, the first posture P1, the second posture P2 and the third posture P3 have been described as examples of the posture of the mobile terminal 100. A posture sensed by the mobile terminal 100 is posture information acquired through the posture sensor included in the mobile terminal 100, and the posture sensor may acquire posture information through an acceleration sensor and/or a gyroscope. However, posture change of the mobile terminal 100 is not acquired only through the posture sensor in the present invention.

FIG. 9 is a diagram for describing posture change of the mobile terminal described in embodiments of the present invention.

For example, a posture or a posture change of the mobile terminal 100 may be acquired on the basis of the distance between the mobile terminal 100 and the external device 200. The distance between the mobile terminal 100 and the external device 200 may be acquired on the basis of signals transmitted/received between the two devices connected to each other for communication through pairing.

Referring to FIG. 9, a case in which the angle of the arm wearing the smart watch 100 is a first angle $\theta_1$ may be defined as the first posture P1, a case in which the angle of the arm is a second angle $\theta_2$ may be defined as the second posture P2 and a case in which the angle of the arm is a second angle $\theta_3$ may be defined as the third posture P3 in a state in which the smart watch 100 is paired with the smartphone 200. The distance between the mobile terminal 100 and the external device 200 may be a first distance D1 in the first posture, may be a second distance D2 in the second posture and may be a third distance D3 in the third posture. That is, the mobile terminal 100 can recognize the first, second and third distances D1, D2 and D3 on the basis of signals transmitted to/received from the external device 200 through pairing and can acquire posture information thereof corresponding to each distance.

FIG. 10 is a flowchart of a method of controlling a mobile terminal according to a third embodiment of the present invention. FIGS. 11a to 11c are diagrams for describing an example in which the method of controlling a mobile terminal according to the third embodiment is realized.

The method of controlling a mobile terminal according to the third embodiment of the present invention may be realized in the mobile terminals 100 and 300 described with reference to FIGS. 1a to 3. The method of controlling a mobile terminal according to the third embodiment of the present invention and operations of the mobile terminal 100 or 300 for realizing the same will be described in detail below with reference to the attached drawings. The third embodiment of the present invention may be realized on the basis of the first embodiment and/or the second embodiment.

Referring to FIG. 10, the mobile terminal 100 may be paired with the external device 200 (S10). The external device 200 may receive and connect a call (S13). Steps S10 and S13 are the same as those described in the first and second embodiments of the present invention.

The external device 200 may sense a gesture of the user in a state in which the call is connected (S30). The gesture may be an action of shaking the external device.

The external device 200 transmits a first control signal to the mobile terminal 100 upon sensing the gesture. The first control signal may be a control signal for executing an application through which details of the call which needs to be confirmed by the user can be immediately confirmed.

The mobile terminal 100 may execute the application related to the details of the call upon reception of the first control signal (S300). Execution of the application will be described in more detail with reference to FIGS. 11a to 11c.

The controller 180 may sense a posture change upon execution of the application (S310).

The controller 180 may control different pieces of information to be provided through the application according to change in the posture of the mobile terminal 100 (S320).

Referring to FIG. 11*a*, the user may be talking on the phone with the external device (smartphone) 200 gripped by one hand H1 and may perform a gesture of shaking the external device 200 with the mobile terminal (smart watch) 100 worn on the other hand H2.

The user may need to check a schedule in the details of the call. Upon sensing the gesture of shaking the smartphone 200, a scheduler application may be executed in the smart watch 100 to check the schedule through the smart watch 100.

When the smart watch 100 in the first posture is confirmed in a state in which the scheduler application has been executed in the smart watch 100, the controller 180 may provide a scheduler application screen in a first mode in which the scheduler application provides month view of registered schedules. In the first mode, all schedules included in a specific month can be provided. For example, it can be confirmed that there are an event C1 on the sixth, an event C2 on the tenth to twelfth and an event C3 on the twentieth to twenty-second of March.

Referring to FIG. 11*b*, upon sensing a change in the posture of the smart watch 100 from the first posture to the second posture in a state in which the scheduler application is provided in the first mode, the controller 180 may provide a scheduler application screen in a second mode in which the scheduler application provides week view of schedules. More specific schedules can be checked in the second mode than in the first mode. For example, schedules C11 and C12 registered in the week including the sixth of March can be confirmed. In addition, detailed information E1 of the schedule C11 registered on the sixth of March can be displayed at the center of the display unit 151. When the display unit 151 of the watch-type mobile terminal 100 is configured in a circular form, dates of results of execution of the scheduler application may be displayed at the circular edge of the display unit 151.

Referring to FIG. 11*c*, upon sensing a change in the posture of the smart watch 100 from the second posture to the third posture in a state in which the scheduler application is provided in the second mode, the controller 180 may provide a scheduler application screen in a third mode in which the scheduler application provides day view of schedules. More specific schedules can be checked in the third mode than in the second mode. For example, it can be confirmed that a birthday party E11 at Jin's house E12 is scheduled for 15:00 on the sixth of March.

According to the third embodiment of the present invention, it is possible to execute the scheduler application in the smart watch 100 during calling through the smartphone 200 and to control different information to be provided through the scheduler application according to change in the posture of the smart watch 100.

FIG. 12 is a flowchart of a method of controlling a mobile terminal according to a fourth embodiment of the present invention. FIGS. 13*a* and 13*b* are diagrams for describing an example in which the method of controlling a mobile terminal according to the fourth embodiment is realized.

The fourth embodiment of the present invention may be realized on the basis of the above-described first embodiment, second embodiment and/or third embodiment.

Referring to FIG. 12, the mobile terminal 100 may be paired with the external device 200 (S10). The external device 200 may receive and connect a call (S13). Steps S10 and S13 are the same as those in the first to third embodiments of the present invention.

When the call is connected in the external device 200, the mobile terminal paired therewith can sense call connection through a synchronization signal.

The controller 180 may recognize a first gesture of the user with respect to the mobile terminal 100. The first gesture may be a gesture of bending the hand H2 wearing the smart watch 100 at a predetermined angle, as shown in FIG. 13*a*. The first gesture can be sensed through the posture sensor of the mobile terminal 100.

The controller 180 may display at least one application 60 on the display unit 151 upon recognition of the first gesture while the call is connected in the smartphone 200 (S410).

The at least one application 60 may include an application which is frequently used when the user is on the phone. For example, the at least one application may include a message application, a memo application and a contacts application, as shown in FIG. 13*a*.

The controller 180 may receive a control signal from the smartphone 200 in a state in which the at least one application 60 is displayed. The control signal is a signal input through the user input unit of the smartphone 200 and may include a control signal for selecting one of the at least one application 60 provided to the smart watch 100. Meanwhile, the user may have difficulty in manipulating the smart watch 100 while talking on the phone through the smartphone 200 gripped by one hand.

In this case, the controller 180 may select one of applications provided to the smart watch 100 by manipulating the user input units 232*a* and 232*b* provided to the rear side of the smartphone 200, as shown in FIG. 13*b*.

Manipulation of the first user input unit 232*a* provided to the rear side of the smartphone 200 may correspond to scroll input applied to the smart watch 100 in a first direction, and manipulation of the second user input 232*b* may correspond to scroll input applied to the smart watch 100 in a second direction. When the memo application 62 is selected according to a manipulation signal applied to the smartphone 200, the controller 180 can execute the memo application to display at least one prestored note M1, M2 and M3 on the display unit 151.

In addition, the controller 180 may record a telephone conversation through the smartphone 200, STT-convert the recorded content and store the converted content as a new note M4.

FIG. 14 is a flowchart of a method of controlling a mobile terminal according to a fifth embodiment. The method of controlling a mobile terminal according to the fifth embodiment of the present invention may be realized in the mobile terminals 100 and 300 described with reference to FIGS. 1*a* to 3. The method of controlling a mobile terminal according to the fifth embodiment of the present invention and operations of the mobile terminal 100 or 300 for realizing the same will be described in detail below with reference to the attached drawings.

Referring to FIG. 14, the controller 180 senses the posture of the mobile terminal 100 (S500). Information about the posture of the mobile terminal can be acquired through the posture sensor (posture sensing unit 143 in FIG. 1) as described above.

The controller 180 may provide different screens to the touchscreen 151 according to postures of the mobile terminal which are sensed through the posture sensing unit.

Postures of the mobile terminal 100 sensed through the posture sensing unit can be divided into the first posture and the second posture (S501 and S503).

The first posture may correspond to a state in which the mobile terminal 100 is substantially level with the ground. Accordingly, when the mobile terminal 100 is placed on a certain surface, the mobile terminal 100 can be determined to be in the first posture. Meanwhile, the mobile terminal 100 may be level with the ground although the user holds the mobile terminal 100. That is, when the mobile terminal is vertically lifted by a certain distance while being level with the ground, the mobile terminal 100 can also be determined to be in the first posture.

According to one embodiment of the present invention, when the mobile terminal 100 is not level with the ground and the angle formed between the mobile terminal 100 and the ground is less than a predetermined angle, the posture of the mobile terminal 100 may be recognized as the first posture.

The second posture may include a state in which the mobile terminal 100 forms a predetermined angle with respect to the ground. The predetermined angle may be equal to or greater than 45°. The second posture may be a posture of the mobile terminal 100 when the user intends to use the mobile terminal 100 in an upright position.

Accordingly, according to one embodiment of the present invention, a state in which the mobile terminal 100 is placed horizontally is classified as the first posture and a state in which the mobile terminal 100 is in an upright position is classified as the second posture.

The controller 180 may determine whether the posture of the mobile terminal 100 is changed from the first posture to the second posture (S510).

The controller 180 may display tilting guide information on the touchscreen 151 upon sensing change of the posture of the mobile terminal 100 from the first posture to the second posture (S520).

The tilting guide information may include information on a tilting direction of the mobile terminal 100 and information on a function executed when the mobile terminal is tilted in the tilting direction. The tilting guide will be described in more detail below with reference to FIG. 17.

When the mobile terminal is tilted in a first direction in a state in which the tilting guide is displayed (S530), the controller 180 executes a first function corresponding to the first direction (S535). When the mobile terminal is tilted in a second direction (S540), the controller 180 executes a second function corresponding to the second direction (S545).

The first function and the second function may include at least one application which can be installed and implemented in the mobile terminal. In addition, the first function and/or the second function may include at least one application which can be executed in connection with hardware included in the mobile terminal 100.

For example, one of the first and second functions may correspond to a function of capturing an image according to execution of a camera application. Further, one of the first and second functions may correspond to a function of releasing a lock mode of the touchscreen 151.

For example, one of the first and second functions may correspond to a function of processing a predetermined event occurring in the mobile terminal 100 through a first method and the other may correspond to a function of processing the event through a second method. For example, when the event is call reception, the first function may correspond to a function of receiving and connecting a call and the second function may correspond to a function of rejecting call reception.

FIG. 15 is a diagram for describing a change in the posture of the mobile terminal according to the first embodiment of the present invention.

Referring to FIG. 15(a), the mobile terminal 100 may be substantially level with respect to the ground. This state may be called the first posture according to the first embodiment of the present invention. On the other hand, a state in which the body of the mobile terminal 100 forms a predetermined angle $\theta_1$ or wider with respect to the ground may be called the second posture. Accordingly, a state in which the body of the mobile terminal 100 is substantially perpendicular to the ground can be called the second posture.

In the first embodiment of the present invention, a state in which the entire rear surface of the body of the mobile terminal 100 contacts the ground may be defined as the first posture, whereas a state in which only at least part of the rear surface of the body of the mobile terminal contacts the ground or the body of the mobile terminal 100 is perpendicular to the ground may be defined as the second posture.

Referring to FIG. 15(b), when the mobile terminal 100 is tilted in the first or second direction in a state in which the tilting guide is displayed since the mobile terminal 100 is in the second posture, the controller 180 may control a function corresponding to the tilting direction to be executed.

Here, tilting in the first direction may be defined as tilting to the left on the basis of a first corner of the body of the mobile terminal 100 in the second posture, and tilting to the right may be defined as tilting in the second direction. When the user grips the mobile terminal 100 with the left hand, the first corner may refer to the lower left corner (FIG. 15(b)). When the user grips the mobile terminal 100 with the right hand, the first corner may refer to the lower right corner.

Various examples in which display composition varies with change in the posture of the mobile terminal 100 in accordance with the first embodiment of the present invention will be described below.

FIG. 16 illustrates an example of providing different screens to the display when the posture of the mobile terminal is changed according to the first embodiment of the present invention.

Referring to FIG. 16, the mobile terminal 100 may be placed on the floor. The controller 180 may control the mobile terminal 100 to operate in a low power mode upon determining the posture of the mobile terminal 100 to be the first posture through the posture sensing unit.

The low power mode may be realized by minimizing the luminance of the touchscreen 151 (to a first luminance S1) or minimizing the quantity of always on display (AOD) information T displayed on the touchscreen 151. The AOD information T may include time and date information.

When the mobile terminal 100 is lifted from the floor by a distance D1, the luminance of the touchscreen 151 may be controlled to be changed from the first luminance S1 to a second luminance S2 higher than the first luminance. In this case, the AOD information T is not changed and only the luminance of the touchscreen 151 may be changed (from S1 to S2).

When the posture of the mobile terminal 100 is changed from the first posture in which the mobile terminal 100 is placed on the floor to the second posture in which the mobile terminal 100 forms a predetermined angle $\theta_2$ with respect to the floor, the controller 180 may control the luminance of the touchscreen 151 to be changed to a third luminance S3 and provide additional information W to the touchscreen 151 in addition to the AOD information T. The additional information W may include widget icons indicating information changing in real time. For example, the widget icons may include a weather widget icon and a health application widget icon set by the user, a multimedia widget icon for controlling multimedia content executed in the background, etc. Information that can be added to the AOD information T in the second posture is not limited to the aforementioned example and various types of information can be set by the user.

FIG. 17 illustrates examples of the posture of the mobile terminal when the tilting guide is provided according to the fifth embodiment of the present invention.

Referring to FIG. 17, the controller 180 may display the tilting guide G (10, 11, 20, 21) on the touchscreen 151 when the posture of the mobile terminal 100 is changed from the first posture to the second posture in which the mobile terminal 100 forms a third angle $\theta_3$ with respect to the floor.

Although a case in which the angle between the mobile terminal 100 and the ground corresponds to the second angle $\theta_2$ is defined as the second posture in FIG. 16, a case in which the angle between the mobile terminal 100 and the ground corresponds to the third angle $\theta_3$ is defined as the second posture in FIG. 17.

The tilting guide G may include a first object 1000 and a second object 2000 respectively corresponding to the first function and the second function executed according to motion of the mobile terminal. Further, the tilting guide may include an object 1100 indicating a first tilting direction and an object 2100 indicating a second tilting direction. The objects 1100 and 2100 indicating tilting directions may be displayed in association with the first object 1000 and the second object 2000. For example, the controller 180 displays the first object 1000 and the second object 2000 such that the first object 1000 and the first direction indicator 1100 overlap and the second object 2000 and the second direction object 2100 overlap. Accordingly, the user can intuitively recognize a function to be executed according to tilting direction.

The angle formed between the mobile terminal 100 and the ground between the first posture and the second posture may be the second angle $\theta_2$. The second angle may be less than the third angle, and a threshold angle at which the tilting guide is provided according to the fifth embodiment may be the third angle. Accordingly, in a posture in which the angle between the mobile terminal 100 and the ground is the second angle, the tilting guide according to one embodiment of the present invention is not provided and only the AOD information T and additional information W may be provided. The luminance of the touchscreen 151 may correspond to the first luminance S1 in the case of the first posture of the mobile terminal 100 and may be changed to the third luminance S3 when the mobile terminal 100 forms the second angle with respect to the ground. When the posture of the mobile terminal 100 is changed to the second posture, the luminance of the touchscreen 151 is maintained as the third luminance S3 and only the tilting guide G may be added.

FIGS. 18a and 18b are diagrams for describing an example of executing different functions depending on tilting directions of the mobile terminal through the method of controlling the mobile terminal according to the fifth embodiment of the present invention.

Referring to FIG. 18a, the controller 180 may execute the first function when the mobile terminal 100 is tilted in the first direction and execute the second function when the mobile terminal 100 is tilted in the second direction in a state in which the tilting guide G is displayed on the touchscreen 151.

The tilting guide G includes the first object 1000 corresponding to the first function and the second object 2000 corresponding to the second function. The first function corresponds to the camera application and the first object 1000 corresponds to a camera application icon. The second function corresponds to a function of releasing the lock mode of the mobile terminal 100 or the touchscreen 151 and the second object 2000 corresponds to an icon of the lock mode release function. Further, the first direction object 1100 may overlap with the first object 1000 and the second direction object 2100 may overlap with the second object 2000 on the touchscreen 151.

A case in which the mobile terminal 100 or the touchscreen 151 is in the lock mode corresponds to a state in which a predetermined lock pattern (e.g., password setting, pattern setting, code input or the like) has been set by the user. According to the first embodiment of the present invention, the lock mode can be released through a tilting operation of the mobile terminal 100 in the second posture.

Tilting directions of the mobile terminal 100 may include the first and second tilting directions.

Here, the first tilting direction may refer to a direction in which the mobile terminal 100 is tilted to the left from a predetermined axis and the second tilting direction may refer to a direction in which the mobile terminal 100 is tilted to the right from the predetermined axis.

For example, when the user grips the mobile terminal with the left hand, the predetermined axis may correspond to the lower left corner of the body of the mobile terminal. In this case, the first tilting direction refers to a direction in which the user tilts the mobile terminal 100 to the left on the basis of the left lower corner of the mobile terminal. In addition, the second tilting direction refers to a direction in which the user tilts the mobile terminal 100 to the right.

Referring to FIG. 18b, the predetermined axis may be a vertical central axis of the mobile terminal. In this case, the first tilting direction refers to a direction in which the mobile terminal 100 is tilted to the left from the vertical central axis and the second tilting direction refers to a direction in which the mobile terminal 100 is tilted to the right from the vertical central axis. Accordingly, the controller 180 may execute the camera application to display a preview screen on the touchscreen 151 when the mobile terminal 100 is tilted in the first tilting direction and display an unlock screen on the touchscreen 151 when the mobile terminal 100 is tilted in the second tilting direction in a state in which the tilting guide G is displayed.

The first and second tilting directions are not limited to the aforementioned examples. For example, the horizontal central axis of the mobile terminal may be recognized as the predetermined axis and the mobile terminal 100 may be tilted forward and backward on the basis of the horizontal central axis. In this case, the first tilting direction may refer to a direction in which the mobile terminal is tilted forward on the basis of the horizontal central axis and the second tilting direction may refer to a direction in which the mobile terminal is tilted backward on the basis of the horizontal central axis.

FIG. 19 illustrates another example of providing different screens to the display unit when the posture of the mobile terminal is changed according to the fifth embodiment of the present invention.

According to the fifth embodiment of the present invention, when the posture of the mobile terminal 100 is changed from the first posture to the second posture, different screens may be provided according to whether the posture of the mobile terminal 100 is changed in a state in which touch input applied to the touchscreen 151 is maintained.

Referring to FIG. 19(a), only the AOD information T may be displayed even when the posture of the mobile terminal 100 is changed from the first posture to the second posture. That is, only luminance information can be changed when the posture of the mobile terminal 100 is changed from the first posture to the second posture in FIG. 19(a).

Referring to FIG. 19(b), when the posture of the mobile terminal 100 is changed from the first posture to the second posture in a state in which touch input applied to an arbitrary point of the touchscreen 151 is maintained, the additional information W may be displayed in addition to the AOD information T. Further, when a predetermined event occurs in the mobile terminal 100 and is not confirmed, information 3000 about the unconfirmed event may be displayed on the touchscreen 151 in addition to the additional information W. The predetermined event may include an unconfirmed message, an unanswered call, unconfirmed notification information and the like received through the communication unit.

When the unconfirmed event information 3000 is touched in a state in which the unconfirmed event information 3000 is displayed, the controller 180 may display an execution screen of an application corresponding to the event on the touchscreen 151 such that the user can confirm the event without switching the touchscreen to the home screen.

FIG. 20 is a diagram for describing an example of controlling a touch sensing state depending on change in the posture of the mobile terminal according to a sixth embodiment of the present invention.

The sixth embodiment of the present invention may be realized in the mobile terminals 100 and 300 described with reference to FIGS. 1a to 2 on the basis of the fifth embodiment.

The sixth embodiment of the present invention is described with reference to FIG. 16. In FIG. 16, the touchscreen 151 may not recognize user touch input in the first posture in which the mobile terminal 100 is substantially level with the ground. That is, the controller 180 may control the touch sensing state of the touchscreen 151 according to the posture of the mobile terminal 100. According to the second embodiment of the present invention, the touch sensing state may be controlled to be deactivated in the posture of the mobile terminal 100 shown in FIG. 5. That is, information displayed on the screen and the luminance of the touchscreen are controlled and the touch sensing state can be maintained in a deactivated state even in the second posture in which the mobile terminal 100 forms a predetermined angle with respect to the ground. When the mobile terminal 100 is substantially perpendicular to the ground as shown in FIG. 20, the touch sensing state of at least a predetermined area TA of the touchscreen 151 is activated such that user touch input can be recognized through the area TA. The area TA in which the touch sensing state is activated may be changed according to information displayed on the touchscreen 151 when the mobile terminal 100 is in an upright position.

For example, the controller 180 may display unconfirmed events 3100, 3200 and 3300 on the touchscreen 151 when the mobile terminal 100 is in an upright position and activate the touch sensing state of the area in which the unconfirmed events 3100, 3200 and 3300 are displayed. Upon reception of touch input applied to a specific confirmed event 3100 among the unconfirmed events 3100, 3200 and 3300 displayed in the activated area TA, the controller 180 may display an execution screen 4100 of an application corresponding to the specific unconfirmed event 3100 on the touchscreen 151.

According to the sixth embodiment of the present invention, the touch sensing state of at least some area of the touchscreen 151 may be activated in a lock mode state of the touchscreen 151. When the specific unconfirmed event 311 is touched in this state, the lock mode can be released and, simultaneously, the execution screen of the application corresponding to the selected event 3100 can be immediately displayed.

FIGS. 21a to 22b are diagrams for describing a method of controlling a mobile terminal according to a seventh embodiment of the present invention.

The seventh embodiment of the present invention may be realized in the mobile terminals 100 and 300 described with reference to FIGS. 1a to 2 on the basis of the above-described fifth embodiment and/or the sixth embodiment.

Mobile terminals which realize the above-described embodiments may be wearable devices. For example, the mobile terminal 100 may be a watch-type mobile terminal including a body, a touchscreen provided to the front side of the body, and a band connected to the body and configured to be worn on a user's wrist. The seventh embodiment of the present invention can display different pieces of information according to change in the posture of the watch-type mobile terminal worn by the user. The watch-type mobile terminal 300 may have a configuration as illustrated in FIG. 2. Hereinafter, the watch-type mobile terminal will be described using reference numeral 100 as in the fifth and sixth embodiments.

In the seventh embodiment of the present invention, postures of the mobile terminal are defined differently from those in the fifth and sixth embodiments. For example, a state in which the mobile terminal 100 is substantially level with the ground is defined as the first posture and a state in which the mobile terminal 100 forms a predetermined angle with respect to the ground is defined as the second posture in the fifth and sixth embodiments.

However, in the seventh embodiment of the present invention, the first posture of the mobile terminal 100 can be defined according to the angle formed between the touchscreen 151 and the ground.

For example, the first posture can be defined by an angle formed between the touchscreen 151 of the watch-type mobile terminal 100 and the ground, as shown in FIG. 21a.

The watch-type mobile terminal 100 may also include the posture sensor 143 (refer to FIG. 1a) which may include at least one acceleration sensor, at least one gyroscope or a sensing signal processor (not shown) for compensating a sensing value or converting sensor information. The posture sensor can sense linear motion, rotary motion, shaking information and the like of the touchscreen 151. Particularly, the acceleration sensor can acquire information about presence or absence, distance, speed, acceleration and direction of movement of the mobile terminal 100. Refer to the description with respect to 143 in FIG. 1a for detailed operation of the posture sensor.

Referring to FIG. 21a, the posture sensor may sense a first angle $\theta_1$ formed between the touchscreen 151 and the ground and the controller 180 may define the posture according to the first angle $\theta_1$ as the first posture. The watch-type mobile terminal 100 can display AOD information in the first posture. The AOD information has been described with reference to FIG. 16.

The posture sensor may sense a second angle $\theta_2$ formed between the touchscreen 151 and the ground and the controller 180 may define the posture according to the second angle $\theta_2$ as the second posture. In the second posture, the watch-type mobile terminal 100 can provide the same information as the information provided to the touchscreen 151 in the first posture. Here, the controller 180 may control the luminance of the touchscreen 151 in the second posture to be different from that in the first posture. The luminance in the second posture may be higher than that in the first posture.

The posture sensor may sense a third angle $\theta_3$ formed between the touchscreen 151 and the ground and the controller 180 may define the posture according to the third angle $\theta_3$ as the third posture. The third angle $\theta_3$ is an angle formed between the touchscreen 151 and a virtual line perpendicular to the touchscreen 151, and the touchscreen 151 may be in a substantially vertical state at this angle.

The controller 180 may display the tilting guide on the touchscreen 151 when the watch-type mobile terminal 100 is in the third posture. The tilting guide has been described in the first embodiment of the present invention. The tilting guide may include the first object 1000 corresponding to the first function and the second object 2000 corresponding to the second function according to tilting direction and the objects may be displayed along with direction objects 1100 and 1200 indicating tilting directions as described above.

According to the seventh embodiment of the present invention, although the posture of the mobile terminal 100 sensed through the posture sensor may be recognized by the angle between the touchscreen 151 and the ground, the posture of the mobile terminal 100 may be recognized according to the speed, acceleration and direction of the mobile terminal, acquired through sensing values of an acceleration sensor and a gyroscope, in addition to the angle.

For example, when the posture of the mobile terminal 100 is changed from the first posture to the third posture, the user's arm having the wrist wearing the watch-type mobile terminal 100 or the posture of the user may be changed. As the position of part of the user's body changes, the posture of the mobile terminal 100 can be changed from the first posture to the third posture. Accordingly, information on the posture of the mobile terminal 100 may be acquired by sensing motion of part of the user's body through the acceleration sensor and/or the gyroscope.

Referring to FIG. 21*b*, the controller 180 may display the tilting guide on the touchscreen 151 when the posture of the mobile terminal 100 is changed to the third posture. The controller 180 may execute the messenger application corresponding to the first tilting direction upon sensing tilting of the mobile terminal 100 in the first tilting direction (to the right) according to a gesture of the user in the third posture in which the tilting guide is displayed. The controller 180 may execute the unlock function corresponding to the second tilting direction upon sensing tilting of the mobile terminal 100 in the second tilting direction (to the left). The home screen can be provided to the touchscreen according to execution of the unlock function.

Although the messenger function and the unlock function have been described as functions executed according to tilting directions in FIGS. 21*a* and 21*b*, the present invention is not limited thereto. For example, tilting information included in the tilting guide shown in FIG. 21*a* may vary according to types of events occurring in the mobile terminal 100.

Referring to FIG. 22*a*, a predetermined event may occur when the mobile terminal 100 is in the first posture. The event may be call reception. The type of the event is not limited to call reception. The event may include any event that can occur in the mobile terminal 100.

The first, second and third postures of the mobile terminal 100 have been described with reference to FIG. 21*a*.

When the mobile terminal 100 receives a call in the first posture, the controller 180 may display a call-waiting screen for processing the received call on the touchscreen 151. When the posture of the mobile terminal 100 is changed to the third posture through the second posture, the controller 180 may provide the tilting guide on the call-waiting screen. The tilting guide may be displayed on the call-waiting screen along with the first object 1000 for connecting the received call and the second object 2000 for holding connection of the received call or disconnecting the call. The direction objects 1100 and 2100 may be displayed along with the first object 1000 and the second object 2000.

Referring to FIG. 22*b*, the controller 180 may sense tilting of the mobile terminal 100 in the first direction (to the left) through a gesture of the user in the third posture in which the tilting guide is displayed on the call-waiting screen. The controller 180 may execute a function of connecting the received call and display a call connection screen on the touchscreen 151 upon sensing tilting input in the first direction. In addition, the controller 180 may execute a function of terminating the received call upon sensing tilting input in the second direction (to the right).

When the mobile terminal 100 receives a call in the first posture, the controller 180 may not display a user interface (e.g., tilting guide) for processing call reception in the first posture and the second posture. The controller 180 may output only a predetermined bell sound or vibration for indicating the received call in the first posture and the second posture, and when the posture of the mobile terminal 100 is changed to the third posture, display the call-waiting screen and the tilting guide on the touchscreen 151.

Embodiments related to control methods that can be realized in above-described mobile terminal have been described with reference to the attached drawings. Those skilled in the art will appreciate that the present invention may be carried out in other specific ways than those set forth herein without departing from the spirit and essential characteristics of the present invention.

The above-described present invention may be implemented as computer-readable code in a medium having programs stored thereon. Computer-readable media include all kinds of recording devices storing data that can be read by computer systems. Examples of possible computer-readable media include HDD (Hard Disk Drive), SSD (Solid State Disk), SDD (Silicon Disk Drive), ROM, RAM, CD-ROM, a magnetic tape, a floppy disk, and an optical data storage device. If desired, the machine-readable medium may be realized in the form of a carrier wave (for example, a transmission over the Internet). The computer may include the controller 180 of the mobile terminal. Therefore, the above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

REFERENCE SIGNS LIST

100: Mobile terminal
151: Touchscreen
180: Controller

The invention claimed is:

1. A mobile terminal, comprising:
a body;

a band connected to the body and formed to be worn on a user's wrist;

a display coupled to the body and configured to display information;

a communication unit configured to perform communication with an external device;

a sensor unit configured to sense posture of the body;

a microphone configured to receive voice input of a user; and a controller configured to:

cause the display to display different types of information according to a change in the posture of the body to a first posture as sensed by the sensor unit, when the external device is in a connected call state and when the mobile terminal is paired with the external device;

receive the voice input via the microphone during a voice input mode;

perform speech-to-text (STT) converting of the voice input to generate text associated with the voice input; and cause the display to display the text, wherein the voice input mode is activated when the posture of the body is changed from a second posture to a third posture, wherein distance between the mobile terminal and the external device in the second posture is shorter than that in the first posture, and distance between the mobile terminal and the external device in the third posture is shorter than that in the second posture.

2. The mobile terminal according to claim 1, wherein the sensor unit includes at least one of an acceleration sensor or a gyroscope, and wherein the controller is further configured to cause the display to sequentially display the different types of information, according to the change in the posture of the body from the first posture to the second posture.

3. The mobile terminal according to claim 1, wherein the controller is further configured to:

cause the display to display message reception notification information when the posture of the body is changed to the first posture, when the external device in in the connected call state and when a message has been received at the external device.

4. The mobile terminal according to claim 3, wherein the controller is further configured to:

cause the display to display at least some of the received message, when the posture of the body is changed from the first posture to the second posture.

5. The mobile terminal according to claim 1, wherein when the external device is in the connected call state and the external device is located proximate to the user's ear, the second posture is defined as a distance closer to the external device than the first posture and the third posture is defined as a distance closer to the external device than the second posture.

6. The mobile terminal according to claim 1, wherein the controller is further configured to:

transmit a control signal to the external device when the voice input mode is activated, wherein the control signal causes any voice input received at the external device to not be communicated while the connected call state is maintained.

7. The mobile terminal according to claim 6, wherein the controller is further configured to:

terminate the voice input mode and transmit a second control signal to the external device, when the posture of the mobile terminal is changed from the third posture to one of the first posture or the second posture, wherein the second control signal permits resuming of a call function such that any voice input received at the external device is communicated while the connected call state is maintained.

8. The mobile terminal according to claim 1, wherein the controller is further configured to:

execute an application related to content of a call while the connected call state of the external device is maintained; and control information provided by the application according to a change in the posture of the body as sensed by the sensor unit.

9. The mobile terminal according to claim 1, wherein the controller is further configured to:

cause the display to display a list identifying at least one application, when the posture of the body changes from the first posture to the second posture, and when the external device is in the connected call state;

select an application from the list based on input received from the external device; and execute the selected application.

* * * * *